United States Patent
Krauss et al.

(10) Patent No.: US 10,471,409 B2
(45) Date of Patent: Nov. 12, 2019

(54) METHODS FOR PRODUCING HYDROGEN USING NANOPARTICLE-CATALYST MIXTURES

(71) Applicant: University of Rochester, Rochester, NY (US)

(72) Inventors: Todd D. Krauss, Pittsford, NY (US); Richard Eisenberg, Rochester, NY (US); Patrick Holland, New Haven, CT (US); Fen Qiu, Rochester, NY (US); Zhiji Han, Rochester, NY (US)

(73) Assignee: University of Rochester, Rochester, NY (US)

(*) Notice: Subject to any disclaimer, the term of this patent is extended or adjusted under 35 U.S.C. 154(b) by 94 days.

(21) Appl. No.: 14/439,304

(22) PCT Filed: Nov. 5, 2013

(86) PCT No.: PCT/US2013/068480
§ 371 (c)(1),
(2) Date: Apr. 29, 2015

(87) PCT Pub. No.: WO2014/071366
PCT Pub. Date: May 8, 2014

(65) Prior Publication Data
US 2015/0290615 A1    Oct. 15, 2015

Related U.S. Application Data

(60) Provisional application No. 61/722,374, filed on Nov. 5, 2012.

(51) Int. Cl.
| | | |
|---|---|---|
| *B01J 19/12* | (2006.01) | |
| *B01J 23/755* | (2006.01) | |
| *C01B 3/06* | (2006.01) | |

(52) U.S. Cl.
CPC .......... *B01J 19/122* (2013.01); *B01J 23/755* (2013.01); *C01B 3/06* (2013.01); *Y02E 60/36* (2013.01)

(58) Field of Classification Search
CPC ........ C01G 11/00; C01G 11/02; C01G 20/00; C01G 20/21; C01G 15/00; C01G 17/00;
(Continued)

(56) References Cited

U.S. PATENT DOCUMENTS

| | | |
|---|---|---|
| 4,568,435 A | 2/1986 | Shelnutt |
| 5,650,051 A | 7/1997 | Wada et al. |

(Continued)

FOREIGN PATENT DOCUMENTS

| | | |
|---|---|---|
| CN | 101767021 A | 7/2010 |
| WO | 2009158385 | 12/2009 |
| WO | 2011090981 A2 | 7/2011 |

OTHER PUBLICATIONS

Holmes, Michael A., Troy K. Townsend, and Frank E. Osterloh. "Quantum confinement controlled photocatalytic water splitting by suspended CdSe nanocrystals." Chemical Communications 48.3 (2012): 371-373.*

(Continued)

*Primary Examiner* — Richard M Rump
(74) *Attorney, Agent, or Firm* — Hodgson Russ LLP

(57) ABSTRACT

Provided are compositions for and methods of producing hydrogen. For example, the compositions comprise nanocrystals, a catalyst, a source of electrons, and an aqueous medium. The nanocrystals, catalyst, aqueous medium, and, optionally, the source of electrons are present as a mixture. The methods produce hydrogen by exposing the compositions to electromagnetic radiation (e.g., solar flux).

20 Claims, 15 Drawing Sheets

(58) Field of Classification Search
CPC ...... C01B 33/02; Y10S 420/90; B01J 19/122; B01J 23/755
See application file for complete search history.

(56) References Cited

U.S. PATENT DOCUMENTS

| | | | |
|---|---|---|---|
| 6,300,274 B1 | 10/2001 | Park et al. | |
| 8,188,005 B2 * | 5/2012 | Choi | C05D 9/02 |
| | | | 502/102 |
| 2006/0116282 A1 * | 6/2006 | Honda | B01J 23/10 |
| | | | 502/129 |
| 2010/0062928 A1 | 3/2010 | Jin | |
| 2012/0145532 A1 | 6/2012 | Smolyakov et al. | |

OTHER PUBLICATIONS

Han, Zhiji, et al. "A Nickel Thiolate Catalyst for the Long-Lived Photocatalytic Production of Hydrogen in a Noble-Metal-Free System." Angewandte Chemie 124.7 (2012): 1699-1702.*
Zhang, Wei, et al. "Nickel-thiolate complex catalyst assembled in one step in water for solar H2 production." Journal of the American Chemical Society 133.51 (2011): 20680-20683.*
Nann, Thomas, et al. "Water splitting by visible light: a nanophotocathode for hydrogen production." Angewandte Chemie International Edition 49.9 (2010): 1574-1577.*
Ran, Jingrun, Jiaguo Yu, and Mietek Jaroniec. "Ni (OH) 2 modified CdS nanorods for highly efficient visible-light-driven photocatalytic H 2 generation." Green Chemistry 13.10 (2011): 2708-2713.*
Wen, Fuyu, et al. "Photocatalytic H2 production on hybrid catalyst system composed of inorganic semiconductor and cobaloximes catalysts." Journal of catalysis 281.2 (2011): 318-324.*
Han, Z. et al. Robust Photogeneration of H2 in Water Using Semiconductor Nanocrystals and a Nickel Catalyst, Science, Nov. 8, 2012, vol. 338, pp. 1321-1324.
Bonomi et al., Synthesis and characterization of metal derivatives of dihydrolipoic acid and dihydrolipoamide, Inorganica Chimica Acta, 192 (1992) 237-242. 1992.
Wang et al., Synthesis of Zn—Cu—Cd sulfide nanospheres with controlled copper locations and their effects on photocatalytics activities for H2 production, International Journal of Hydrogen Energy, 35 (2010), 5245-5253. Apr. 1, 2010.
Streich et al., High-Turnover Photochemical Hydrogen Production Catalyzed by a Model Complex of the [FeFe]-Hydrogenase Active Site, Chem. Eur. J. 2010, 16, 60-63. 2010.
Zhu et al., Formation of 1D Hierarchical Structures Composed of Ni3S2 Nanosheets on CNTs Backbone for Supercapacitors and Photocatalytic H2 Production, Adv. Energy Mater., 2012. 2012.
Kudo, Photocatalysis and solar hydrogen production, Pure Appl. Chem., vol. 79, No. 11, pp. 1917-1927, 2007. 2007.
Chen et al., Ellipsoidal hollow nanostructures assembled from anatase TiO2 nanosheets as a magnetically seperable photocatalyst, Chem. Commun., 2011, 47, 2631-2633. Jan. 13, 2011.
Wang et al., Highly active ZnxCd1-xS photocatalysts containing earth abundant elements only for H2 production from water under visible light, Catal. Sci. Technol., 2011, 1, 940-947. 2011.
Hong et al., Self-assembled dye-layered double hydroxide-Pt nanoparticles: a novel H2 evolution system with remarkably enhanced stability, Nanoscale, 2011, 3, 4655. Oct. 5, 2011.
Wang et al., Ni2+-doped ZnxCd1-xS photocatalysts from single-source precursors for efficient solar hydrogen production under visible light irradiation, Catal. Sci. Technol., 2012, 2, 581-588. Dec. 21, 2011.
Hong et al., Mesoporous carbon nitride with in situ sulfur doping for enhanced photocatalytic hydrogen evolution from water under visible light, J. Mater. Chem., 2012, 22, 15006. May 14, 2012.
Han et al., Nickel-complexes with a mixed-donor ligand for photocatalytic hydrogen evolution from aqueous solutions under visible light, RSC Advances, 2012, 2, 8293-8296. Jul. 24, 2012.
Holmes et al., Quantum confinement controlled photocatalytic water splitting by suspended CdSe nanocrystals, Chem. Commun., 2012, 48, 371-373. Nov. 14, 2011.
Eckenhoff et al., Molecular systems for light driven hydrogen production, Dalton Trans., 2012, 41, 13004. May 30, 2012.
Yu et al., Efficient photochemical production of hydrogen in aqueous solution by simply incorporating a water-insoluble hydrogenase mimic into a hydrogel, J. Mater. Chem. A, 2014, 2, 20500. Oct. 31, 2014.
Esswein et al., Hydrogen Production by Molecular Photocatalysis, Chem. Rev. 2007, 107, 4022-4047. Oct. 10, 2007.
Fihri et al., Cobaloxime-Based Photocatalytic Devices for Hydrogen Production, Angew. Chem. Int. Ed. 2008, 47, 564-567. 2008.
Han et al., A Nickel Thiolate Catalyst for the Long-Lived Photocatalytic Production of Hydrogen in a Noble-Metal-Free System, Angew. Chem. Int. Ed. 2012, 51, 1667-1670. 2012.
Alstrum-Acevedo et al., Chemical Approaches to Artificial Photosynthesis, Inorg. Chem. 2005, 44, 6802-6827. Sep. 26, 2005.
Probst et al., Photocatalytic H2 Production from Water with Rhenium and Cobalt Complexes, Inorg. Chem. 2011, 50, 3404-3412. Mar. 2, 2011.
Creutz et al., Homogeneous Catalysis of the Photoreduction of Water by Visible Light. Mediation by a Tris(2,2'-bipyridine)ruthenium(II)-Cobalt(II) Macrocycle System, Journal of the American Chemical Society, 101:5, 1299. Feb. 28, 1979.
Brown et al., Controlled Assembly of Hydrogenase-CdTe Nanocrystal Hybrids for Solar Hydrogen Production, J. Am. Chem. Soc. 2010, 132, 9672-9680. Jun. 28, 2010.
DiSalle et al., Orchestrated Photocatalytic Water Reduction Using Surface-Adsorbing Iridium Photosensitizers, J. Am. Chem. Soc. 2011, 133, 11819-11821. Jul. 12, 2011.
Sun et al., Molecular Cobalt Pentapyridine Catalysts for Generating Hydrogen from Water, J. Am. Chem. Soc. 2011, 133, 9212-9215. May 25, 2011.
White et al., Discovering the Balance of Steric and Electronic Factors Needed To Provide a New Structural Motif for Photocatalytic Hydrogen Production from Water, J. Am. Chem. Soc. 2011, 133, 15332-15334. Aug. 29, 2011.
Zhang et al., Nickel-Thiolate Complex Catalyst Assembled in One Step in Water for Solar H2 Production, J. Am. Chem. Soc. 2011, 133, 20680-20683. Dec. 1, 2011.
Zhu et al. Near Unity Quantum Yield of Light-Driven Redox Mediator Reduction and Efficient H2 Generation Using Colloidal Nanorod Heterostructures, J. Am. Chem. Soc. 2012, 134, 11701-11708. Jun. 21, 2012.
McCormick et al., Reductive Side of Water Splitting in Artificial Photosynthesis: New Homogeneous Photosystems of Great Activity and Mechanistic Insight, J. Am. Chem. Soc. 2010, 132, 15480-15483. 2010.
Brown et al., Characterization of Photochemical Processes for H2 Production by CdS Nanorod-[FeFe] Hydrogenase Complexes, J. Am. Chem. Soc. 2012, 134, 5627-5636. Feb. 21, 2012.
Zhang et al., Doped Solid Solution: (Zn0.95Cu0.05)1-xCdxS Nanocrystals with High Activity for H2 Evolution from Aqueous Solutions under Visible Light, J. Phys. Chem. C 2008, 112, 17635-17642. 2008.
Amirav et al., Photocatalytic Hydrogen Production with Tunable Nanorod Heterostructures, J. Phys. Chem. Lett. 2010, 1, 1051-1054. Mar. 8, 2010.
Karunadasa et al., A molecular molybdenum-oxo catalyst for generating hydrogen from water, Nature, vol. 464, 1329. Apr. 29, 2010.
Jasieniak et al., Size-Dependent Valence and Conduction Band-Edge Energies of Semiconductor Nanocrystals, ACS Nano, vol. 5, No. 7, 5888-5902. Jun. 12, 2011.
Lewis et al., Powering the planet: Chemical challenges in solar energy utilization, PNAS, vol. 103, No. 43, 15729-15735. Dec. 11, 2007.
Shemesh et al., Synthesis and Photocatalytic Properties of a Family of CdS—PdX Hybrid Nanoparticles, Angew. Chem. Int. Ed. 2011, 50, 1185-1189. 2011.
Wang et al., A Highly Efficient Photocatalytic System for Hydrogen Production by a Robust Hydrogenase Mimic in an Aqueous Solution, Angew. Chem. Int. Ed. 2011, 50, 3193-3197. 2011.

(56) References Cited

OTHER PUBLICATIONS

McNamara et al., Cobalt-dithiolene complexes for the photocatalytic and electrocatalytic reduction of protons in aqueous solutions, PNAS, vol. 109, No. 39, 15594-15599. Sep. 25, 2012.
Karunadasa et al., A Molecular MoS2 Edge Site Mimic for Catalytic Hydrogen Generation, Science, vol. 335, 698. Feb. 10, 2012.

* cited by examiner

METHODS FOR PRODUCING HYDROGEN USING NANOPARTICLE-CATALYST MIXTURES

CROSS-REFERENCE TO RELATED APPLICATIONS

This application claims priority to U.S. Provisional Application No. 61/722,374, filed on Nov. 5, 2012, the disclosure of which is incorporated herein by reference.

STATEMENT REGARDING FEDERALLY SPONSORED RESEARCH

This invention was made with government support under Grant No. DE-FG02-09ER16121 awarded by the U.S. Department of Energy. The government has certain rights in the invention.

FIELD OF THE DISCLOSURE

The present disclosure generally relates to production of hydrogen. More particularly, the disclosure relates to methods for producing hydrogen using nanoparticles and metal catalysts.

BACKGROUND OF THE DISCLOSURE

The energy storing reaction that is of greatest importance in artificial photosynthesis is the decomposition of water into its constituent elements, $H_2$ and $O_2$, with the former as the fuel. As a redox reaction, water splitting can be divided into its two half-cell components for separate investigation and development. Despite great efforts over the past decade, neither half-reaction has been carried out photochemically in a system composed of earth-abundant elements with both an activity and robustness of the type needed for further development. Homogeneous systems for light-driven reduction of protons to $H_2$ typically suffer from short lifetimes because of decomposition of the light-absorbing molecule and/or catalyst, if present.

Molecular hydrogen ($H_2$) is a clean-burning fuel that can be produced from protons ($H^+$) in the reductive half-reaction of artificial photosynthesis (AP) systems. One of the strategies for light-driven proton reduction features a multicomponent solution with a light absorbing molecule (chromophore) that transfers electrons to a catalyst that reduces protons. However, these solution systems often use non-aqueous solvents, and always have short lifetimes from decomposition of the chromophore over a period of hours. This difficulty has led to more complicated architectures that separate the sites of light absorption and proton reduction. Heterostructures between NCs and traditional precious metal nanoparticle $H_2$ production catalysts, and between NCs and iron-hydrogenases, have produced proton reduction in solution.

BRIEF SUMMARY OF THE DISCLOSURE

Disclosed is a pioneering artificial photosynthetic system. This system can generate over half a million turnovers of $H_2$ with no deterioration of activity, and thus has significant promise for incorporation into full artificial photosynthetic systems. This precious-metal-free system has demonstrated undiminished activity for at least 360 hours under illumination at 520 nm with a quantum yield of 36%, and gives more than 600,000 turnovers in this time.

In an aspect, the present disclosure provides methods for producing hydrogen. In the methods, a combination of nanoparticles, catalyst, and source of electrons (e.g., sacrificial electron donor) in an aqueous medium (e.g., water) is exposed to electromagnetic radiation (e.g., electromagnetic radiation in the solar region of the spectrum) resulting in the production of hydrogen.

In an embodiment, a method for producing hydrogen comprising the steps of: a) contacting a nanoparticle and a metal complex catalyst in an aqueous medium to form a mixture in the presence of a source of electrons; and b) exposing the mixture from a) to electromagnetic radiation having at least a wavelength in the absorption profile of the nanoparticle, where upon exposure to the electromagnetic radiation the nanoparticle is capable of generating an electron that can reduce, in the presence of the catalyst, a proton in the aqueous medium, and where the source of electrons is capable of reducing the nanoparticle after reduction of the proton, such that hydrogen is produced.

Examples of suitable nanoparticles include core-shell nanocrystals, nanorods, and dot-in rods. For example, the nanoparticles are selected from CdSe, CdS, CdTe, PbS, PbTe, PbSe, GaAs, InP, InAs, Si, and Ge nanocrystals.

The metal complex can be a transition metal salt (e.g., a $Ni^{2+}$ salt). The catalyst (e.g., transition metal salt) can be generated in situ.

The source of electrons can be a sacrificial electron donor. The source of electrons can also be an external source of electrons.

In an aspect, the present disclosure provides compositions for producing hydrogen. The compositions comprise nanoparticles, catalyst, an aqueous medium, and, optionally, a source of electrons (e.g., a sacrificial electron donor). In the case where the source of electrons is not present, an external source of electrons as described herein can be used.

A composition for producing hydrogen comprising: a) a nanoparticle, b) a metal complex catalyst; c) a source of electrons; and d) an aqueous medium; where the nanoparticle, metal complex catalyst, and aqueous medium are present as a mixture and, wherein upon exposure to electromagnetic radiation having a wavelength in the absorption profile of the nanoparticle the nanoparticle is capable of generating an electron that can reduce, in the presence of a metal complex catalyst, a proton in the aqueous medium and the source of electrons is capable of reducing the nanoparticle after reduction of the proton. The composition can be used to produce hydrogen.

DETAILED DESCRIPTION OF THE DISCLOSURE

Figure 1:
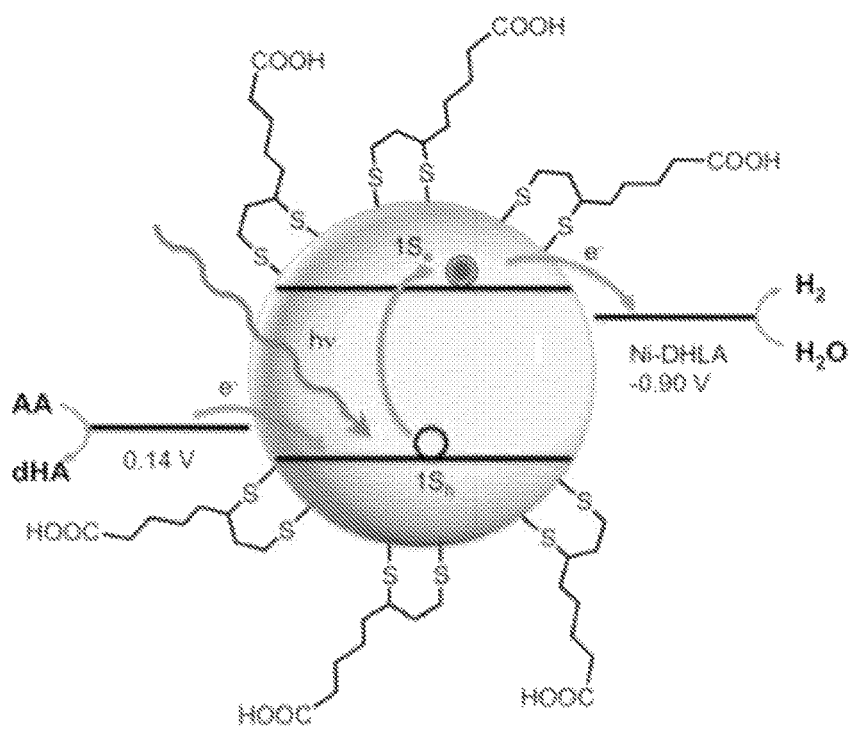
FIG. 1. Energy diagram for $H_2$ production (Abbreviations: AA, ascorbic acid; dHA, dehydroascorbic acid). Potentials are shown vs NHE (pH=4.5). $1S_{e(h)}$ corresponds to the lowest excited electron (hole) state.

The present disclosure provides methods for the production of hydrogen. This disclosure provides an advance in the realm of light to chemical energy conversion and artificial photosynthesis. Provided is an active and robust aqueous system for the photogeneration of hydrogen from water using nanoparticles, e.g., CdSe nanocrystals, as a photosensitizer and a catalyst, e.g., Ni$^{2+}$ thiolates.

Disclosed is a pioneering artificial photosynthetic system. In an embodiment, water-soluble CdSe nanocrystals are used as the light absorber and a solution-based Ni$^{2+}$ catalyst is generated in situ. It was surprisingly observed that this system can generate over half a million turnovers of $H_2$ with no deterioration of activity (event if the nanoparticles agglomerate), and thus has promise for incorporation into full artificial photosynthetic systems. This is the first known disclosure of the use of the combination of semiconductor nanoparticles as light absorbers and simple, solution-based, and earth-abundant metal catalysts for the photogeneration of hydrogen exhibiting the observed durability and activity.

In an embodiment, a robust and active system for solar hydrogen generation in water uses CdSe nanocrystals capped with DHLA (DHLA=dihydrolipoic acid) as the light absorber and a soluble Ni$^{2+}$-DHLA catalyst for proton reduction. This precious-metal-free system has undiminished activity for at least 360 hours under illumination at 520 nm with a quantum yield of 36%, and gives more than 600,000 turnovers in this time.

In an aspect, the present disclosure provides a method for producing hydrogen. In the methods, a combination of nanoparticles, catalyst, and a source of electrons (e.g., electron donor), which may or may not be present in the aqueous medium, in an aqueous medium is exposed to electromagnetic radiation (e.g., electromagnetic radiation in the solar region of the spectrum) resulting in the production of hydrogen.

In an embodiment, the method for producing hydrogen comprises the steps of a) contacting a nanoparticle (e.g., a nanocrystal) and a catalyst in the presence of a source of electrons (e.g., a sacrificial electron donor) in an aqueous solution; and b) exposing the mixture from a) to electromagnetic radiation, such that hydrogen is produced.

The nanoparticle is any nanoparticle that can absorb electromagnetic radiation and act as a photosensitizer. Without intending to be bound by any particular theory, it is considered that a photoexcited nanoparticle transfers an electron to the catalyst that then reduces a proton resulting in formation of hydrogen.

Nanoparticle as used herein includes nanocrystals, quantum dots (QDs), magic size clusters (MSCs), quantum rods, dot-in-rod nanocrystals, quantum wires, dendridic inorganic nanostructures, tetrapods, cubes, core-shell and alloy structures of the preceding, and the like. Nanoparticles include any 3-D geometry whereby one or more dimensions is of such size to be considered quantum confined. For semiconductor materials, quantum confinement is based upon the inherent exciton Bohr radii of the constituent atoms. The nanocrystals includes quantum dots such as, for example, cores, core-shells, alloyed cores, alloyed core-shells, and the like. Type I and Type II nanocrystals can be used.

The nanoparticles can have a narrow size distribution. In an embodiment, a plurality of nanoparticles having a narrow size distribution (e.g., the nanoparticles are substantially monodisperse) is used. In an embodiment, the nanoparticles are substantially monodisperse. The term "substantially monodisperse" when describing nanoparticles denotes a population of nanoparticles of which a major portion, typically at least about 60%, in another aspect from 75% to 90%, fall within a specified particle size range. A population of substantially monodisperse nanoparticles deviates 15% rms (root-mean-square) or less in diameter and typically less than 5% rms. In addition, upon exposure to a primary light source, a substantially monodisperse population of nanoparticles is capable of emitting energy in narrow spectral linewidths, as narrow as 12 nm to 60 nm full width of emissions at half maximum peak height (FWHM), and with a symmetric, nearly Gaussian line shape. The formulator will recognize, the linewidths are dependent on, among other things, the size heterogeneity (i.e., monodispersity) of the nanoparticles in each preparation.

The size of the nanoparticles is important. The absorption profile and, thus, the reduction potential of the nanoparticles is determined, at least in part, by the size of the nanoparticles. It is desirable that a selected size (or size distribution) of nanoparticles be used. Generally, use of smaller nanoparticles is desirable. For example, in the case of CdSe nanocrystals, nanocrystals having a size of 1.5 nm to 30 nm, including all nm values and ranges there between, is used.

It may be desirable to use mixtures of nanoparticles. For example, mixtures of nanoparticles where the nanoparticles have different or at least partially different electromagnetic radiation (e.g., solar spectrum) absorption profiles.

The surface of the nanoparticles (e.g., nanocrystals) can be controlled. A desired surface composition (e.g., surface concentration of anions or cations) can be obtained using known methods. For example, known post particle formation reactions can be used. As another example, a desired surface composition can be obtained without using post particle formation reactions.

In an embodiment, the nanoparticles (e.g., nanocrystals) are capped (i.e., surface functionalized) with a ligand. The ligand can make the nanoparticles soluble in a convenient solvent (preferably water). Examples of suitable ligands include dihydrolipoic acid (DHLA), mercaptopropionic acid (e.g., 3-mercaptopropionic acid), and cysteine. Such capping ligands can be used with CdSe nanocrystals. It may be desirable, depending on the composition and/or structure of the nanocrystals, to use ligands having one or more sulfur atoms.

The nanoparticles can be obtained commercially or produced using methods known in the art. The nanoparticles can be soluble (or form a colloidal suspension) in an aqueous medium (e.g., water). For example, CdSe nanocrystals at a concentration of 0.5 µM to 10 µM are used. Some portion of the nanoparticles can precipitate from mixture and the mixture continue to produce hydrogen.

Examples of suitable nanoparticles include CdSe, CdS, CdTe, PbS, PbTe, PbSe, GaAs, InP, InAs, Si, and Ge nanocrystals, any core-shell nanocrystals, including CdSe/CdS, CdSe/CdTe, CdTe/CdSe, and PbSe/PbS core-shell nanocrystals, nanorods of any of the preceeding examples, and dot-in rods, including CdSe/CdS, CdSe/CdTe, CdTe/CdS, CdTe/CdSe dot-in rods.

The catalyst is any metal complex that can accept an electron from a photoexcited nanoparticle. Mixtures of catalysts (e.g., two or more distinct catalysts) can be used. Transition metal salts can be used. Transitions metal salts of group 6 to group 11 metals can be used. Transition metal salts of 3d metals and 4d metals (e.g., bioavailable metals such as Mo) can be used. Suitable transition metal salts include Cr, Mn, Fe, Co, Ni, Cu, Mo, Ru, Rh, Pd, Ag, W, Os, Ir, Pt, and Au salts. Mixtures of salts can be used. The salts can have one or more ligands. The ligands can be organic ligands. The ligands can be monodentate or polydentate. Examples of suitable monodentate and polydentate ligands include thiolate and other sulfur ligands, as well as substituted pyridine, imine, amine, phosphine, oxime, and carboxylate ligands. The counterions are, for example, nitrate, sulfate, chloride, or any other related ion. The salts are soluble in an aqueous medium (e.g., water) or in mixed aqueous/organic solvents. It is desirable that the catalyst have at least 1 micromolar solubility. For example, nickel catalysts having a solubility of 1 µM to 40 µM, including all values to the uM and ranges therebetween, are used. In an embodiment, the catalyst does not comprise a Noble metal (ruthenium, rhodium, palladium, silver, osmium, iridium, platinum, or gold).

The catalyst can be a monometallic catalyst (i.e., comprise a single metal center) or a multimetallic (e.g., bimetallic) catalyst (i.e., comprise two or more metal centers). The ligands can be monodentate ligands or multidentate ligands. The catalyst can have a 1:1 metal:ligand composition or have another ligand to metal ratio. For example, a catalyst can be a 1:1 Ni(II):DHLA complex.

The catalysts can be cationic or anionic metal-ligand complexes. The catalysts can have one or more redox active ligands. For example, the catalysts one or more benzenedithiolate (bdt), dithiolene, pyridinethiolate ligands, or a combination thereof.

In an embodiment, the catalyst is a $Ni^{2+}$ catalyst. Examples of $Ni^{2+}$ catalysts include Ni(II)(DHLA) complexes, $(Et_4N)Ni(pyS)_3$, $Ni(pySH)_4(NO_3)_2$, $Ni(mpo)_2$ (mpo=2-mercaptopyridine N-oxide), $Ni(NO_3)_2$, $NiCl_2$, Ni(acetate)$_2$, and Ni(P$_2$N$_2$)$_2$. Other examples of suitable catalysts include Co(BF$_4$)$_2$, Co(Cl$_2$bdt)$_2$, CuCl$_2$, and K$_2$PtCl$_4$.

In an embodiment, the catalyst is formed in situ from a metal source and ligand. The metal source can be a metal salt. For example, the metal salt is a metal chloride, nitrate, carboxylate (e.g., acetate), or hydrate thereof. Examples of suitable salts include nickel (II), copper (II), cobalt (II), and iron (II) salts.

In an embodiment, the nanoparticles (e.g., nanocrystals) are capped with a plurality of organic molecules (or mixture of organic molecules) and the catalyst has ligands formed from the same organic molecules. DHLA is an example of such an organic molecule.

The wide range of nanoparticle concentration and/or catalyst concentrations can be used. In order to increase the production of hydrogen, it can be desirable to select the concentration of the nanoparticle and/or catalyst.

For example, where the source of electromagnetic radiation is solar flux, nanoparticle concentrations of 1 micromole to 100 micromoles and catalyst concentration of 0.01 to 10,000 times the nanoparticle concentration can be used. If a concentrator is used, the nanoparticle concentration can be used.

The source of electrons reduces the photoexcited nanoparticle. It is desirable the source of electrons be inexpensive. Mixtures of electron sources can be used. The source of electrons can be an internal (i.e., a part of the nanoparticle/catalyst mixture) electron donor. The internal source of electrons can form a homogeneous mixture with nanoparticles and catalyst. Internal sacrificial electron donors can be used. A fixed amount of source of electrons can be used. An additional source of electrons can be added to the mixture to provide a continuous hydrogen production. Hydrogen production can be continued as long as sufficient source of electrons is added to the mixture. For example, the sacrificial electron donor (e.g., ascorbic acid) is present at concentrations of 0.1 M to 1 M, including all values to 0.1 M and ranges therebetween.

Examples of suitable internal sacrificial electron donors include molecular electron donors such as tertiary amines having alpha C—H bonds (e.g., triethylamine (TEA), triethanolamine (TEOA), ethylenediamine tetraacetic acid (EDTA)), ascorbic acid, hydroquinones (e.g., 1,4-dihydroxybenzene), carbohydrates (e.g., glucose and fructose), and alcohols (e.g., methanol and ethanol). Other examples of suitable discrete sacrificial electron donors include elemental carbon and elemental iron.

The source of electrons can be an external source of electrons, as opposed to an internal source of electrons. The external source of electrons is exogenous relative to the mixture of nanoparticles and catalyst. For example, a solar cell, electrochemical bias, or alternative energy source can be used as an external source of electrons.

The aqueous medium can have a variety of compositions. In an embodiment, the aqueous medium is water. In an embodiment, the aqueous medium comprises water. In another embodiment, the aqueous medium further comprises an organic solvent (or mixture of organic solvents). The organic solvent can be a protic solvent, an aprotic solvent, or a combination thereof. Examples of suitable organic solvents include alcohols such as ethanol, methanol, and ethylene glycol. For example the aqueous medium is a 1:1 EtOH:water mixture by volume.

The pH of the medium can be from 2.0 to 11.0, including all pH values to the 0.1 and ranges therebetween. In order to increase the production of hydrogen, it can be desirable to select the pH of the medium.

Any wavelength (or wavelength range) of electromagnetic radiation that forms a photoexcited nanoparticle can be used. Depending on the nanoparticle, wavelengths in the ultraviolet, visible, and near infrared can be used. Wavelengths in the solar spectrum (e.g., solar flux) can be used. Wavelengths greater than the energy of the lowest unoccupied molecular orbital (LUMO) of the nanoparticle can be used. Wavelengths greater than the bandgap energy of the nanoparticle can be used.

The electromagnetic radiation can be provided in a variety of ways. Any radiation source providing the desired electromagnetic energy wavelength(s) can be used. For example, the electromagnetic radiation can be provided by a lamp (e.g., xenon lamp), arc lamp, black body radiation source, light emitting diode (LED), laser, or sunlight. The electromagnetic radiation can be provided in a continuous manner or intermittently as desired to control hydrogen production.

The nanocrystals, catalyst, source of electrons, and aqueous medium mixture can be present in a vessel. The container allows exposure of the mixture to the desired electromagnetic radiation. The size of the vessel can be scaled to the desired rate of hydrogen production. Examples of suitable containers include flasks, vials, and reactors.

The mixture can be present in an inert atmosphere. For example, the mixture can be present in a nitrogen or argon atmosphere. The atmosphere can be a mixture of inert gases.

The methods can be carried out at a wide range of temperatures. The mixture can be at ambient temperature or elevated temperature. By ambient temperature, it is meant a temperature of 15° C. (59° F.) to 25° C. (77° F.), though differences in climate may acclimate people to higher or lower temperatures. The mixture can be present at an elevated temperature of, for example, 25° C. to 40° C.

It is desirable the nanoparticle photosensitizer (e.g., QDs) and the catalyst (e.g., Ni$^{2+}$ complex) operate at potentials above 0 V with respect to NHE electrodes. For the photosensitizer, this means a LUMO level that is >0 V theoretically. The potential is pH dependent. For example, if the pH is greater than 0 (e.g., water having a pH of 6 to 7), the potential for 2H+=>H$_2$ is higher than 0 V—approximately −0.4 V. Also, the catalyst has some overpotential associated with it. Accordingly, in practice, it is desirable the LUMO be greater than 0 V, and more desirable the LUMO be 0.5 V or greater. A variety of semiconductor materials, such as II-VI or IV-VI materials, will satisfy such LUMO criterion.

Further, there must be the opportunity for contact between the catalyst and the photosensitizer. This contact can be physical contact, as exists in solution, or electrical if a wire that meets the aforementioned LUMO criteria is used.

It is desirable the nanoparticle photosensitizer and catalyst be robust under the conditions of the method. In an embodiment, the properties of the photosensitizer and catalyst are unchanged after 24 hours of continuous exposure to electromagnetic radiation. By unchanged it is meant the spectroscopic properties of the photosensitizer and catalyst are not changed by more than 5%. In various embodiments, the properties of the photosensitizer and catalyst are unchanged after 48 hours, 96 hours, or 200 hours of continuous exposure to electromagnetic radiation.

In an embodiment, the turnover number is at least 250,000 mole H$_2$/mole catalyst/hour. In various embodiments, the turnover number is at least 500,000, 600,000, or 700,000 mole H$_2$/mole catalyst/hour.

Hydrogen can be produced continuously by using the present methods. In an embodiment, the method produces hydrogen continuously for at least 75 hours without addition of the nanoparticle photosensitizer or catalyst. In various embodiments, the method produces hydrogen for at least 100, 200, 300, or 400 hours without addition of the photosensitizer or catalyst.

The steps of the methods described in the various embodiments and examples disclosed herein are sufficient to carry out the methods of the present invention. Thus, in an embodiment, the method consists essentially of a combination of the steps of the methods disclosed herein. In another embodiment, the method consists of such steps.

In an aspect, the present disclosure provides compositions for producing hydrogen. The compositions comprise nanoparticles, catalyst, an aqueous medium, and, optionally, a source of electrons (e.g., a sacrificial electron donor). On exposure to electromagnetic radiation as described herein the compositions produce hydrogen. The nanoparticles, catalyst, aqueous medium, and source of electrons are as described herein. In the case where the source of electrons is not present, an external source of electrons as described herein can be used.

The following examples are presented to illustrate the present disclosure. They are not intended to limiting in any manner.

EXAMPLE 1

This is an example of a hydrogen producing system of the present disclosure.

Semiconductor nanocrystals (NCs) are promising alternative chromophores for light driven proton reduction. Compared to traditional organic chromophores, NCs have superior photostability, larger absorption cross-sections over a broad spectral range, much longer excited state lifetimes, size-tunable electronic and optical states, and the ability to possess and deliver multiple electrons with minimal perturbations to the nanocrystal.

This example provides a light-driven $H_2$ production system with exceptional longevity, maintaining its activity with no decrease for over two weeks using water as solvent. The system is based on light absorption and photoinduced electron transfer from semiconductor nanocrystals that are photolytically stable. The system generates over 600,000 turnovers of $H_2$ without deterioration of activity, and thus has significant promise for incorporation into full AP systems.

Figure 4:
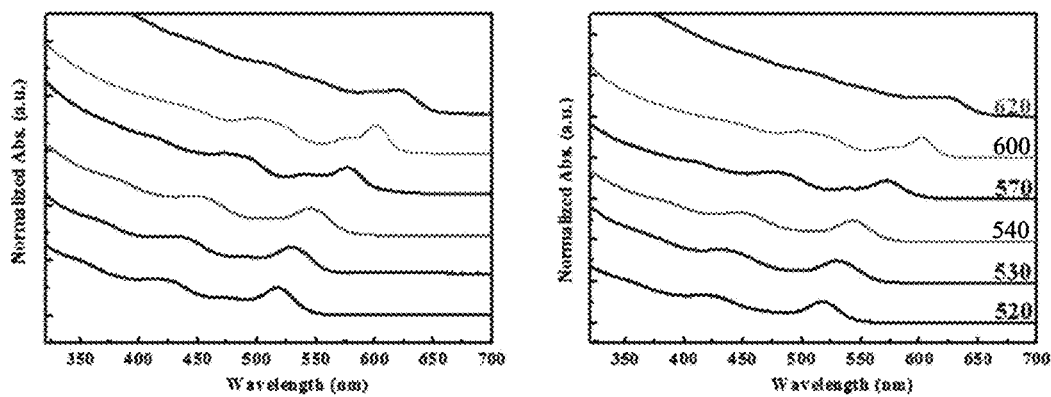
FIG. 4. Absorption spectra for (a) CdSe NCs in hexane and (b) DHLA-capped CdSe NCs in PBS buffer (pH 7.4).

Hydrophobic CdSe NCs with diameters varying from 2.5 to 5.5 nm (defined based on their excitonic absorption feature as NC(520) and NC(620) respectively, FIG. 4) were synthesized by variations of previously known methods. NCs were subsequently made water soluble by capping with dihydrolipoic acid (DHLA, FIG. 1). Photolysis experiments were performed in a custom-built 16-sample apparatus with excitation at 520 nm with an uncertainty of 7.0% in the amount of $H_2$ produced (based on multiple-run experiments). Each 40 mL sample vessel contained 5.0 mL of solution and a sensor to allow real-time monitoring of head space pressure. Ascorbic acid (AA, 0.1 to 1.0 M) was used as the sacrificial electron donor, because reduction of protons by ascorbate is thermodynamically unfavorable ($\Delta E$=−0.41 V) under these conditions, and light energy is needed to bring about $H_2$ production (FIG. 1).

Figure 2:
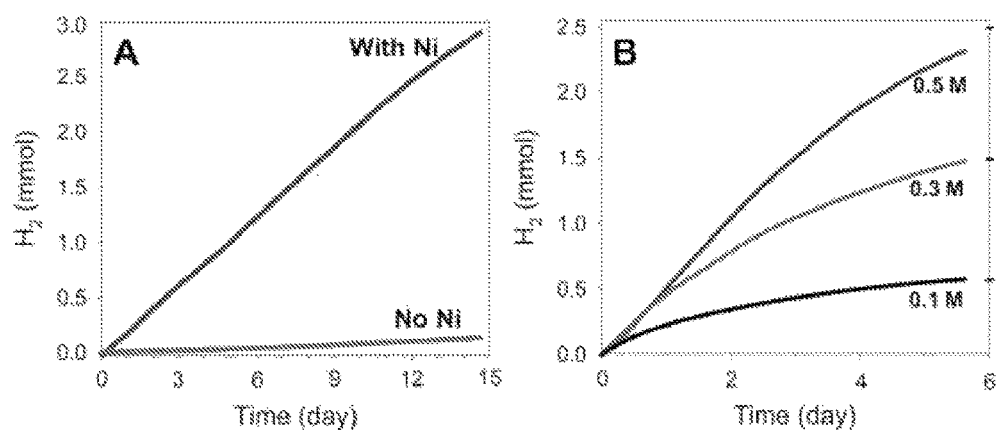
FIG. 2. (A) $H_2$ production over time from photolysis of an aqueous solution of 10.0 µM [Ni(NO$_3$)$_2$], 0.5 µM [NC(570)], and 1.0 M AA compared to an identical system without the nickel(II) additive. (B) Photolytic $H_2$ production with different initial concentrations of AA in a system containing 20.0 µM [Ni(NO$_3$)$_2$] and 1.0 µM [NC(570)]. The marks on the right axis indicate the theoretical maximum of $H_2$ production based on the amount of AA added. Photolysis experiments used a light-emitting diode (LED) source ($\lambda$=520 nm, 13 mW cm$^{-2}$) at 15° C. and 1 atm initial pressure of $N_2$:$CH_4$ (79:21 mole %) with $CH_4$ as an internal standard for $H_2$ quantification by GC analysis.
Figure 5:
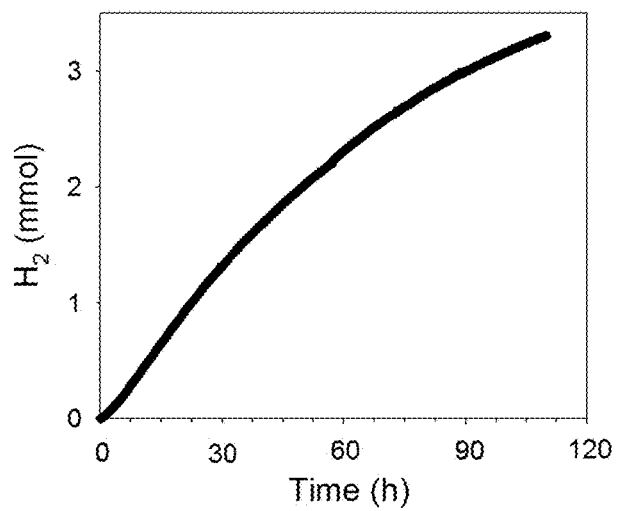
FIG. 5. Photocatalytic hydrogen production from a system containing NC(540) (5.0 μM), Ni(NO$_3$)$_2$ (1.0 μM), AA (0.8 M) in $H_2O$ (5.0 mL) at pH 4.5 upon irradiation with 520 nm LED (13 mW/cm$^2$).
Figure 6:
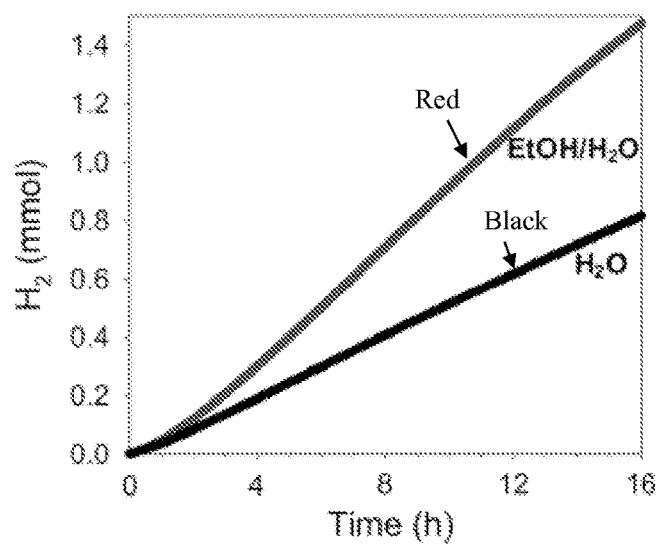
FIG. 6. Photocatalytic hydrogen production from systems containing NC(540) (4.0 μM), Ni(NO$_3$)$_2$ (4.0 μM), AA (0.5 M) in $H_2O$ (5.0 mL) at pH 4.5 (black) and in 1:1 EtOH/$H_2O$ (5.0 mL) at pH 5.0 (red) upon irradiation with 520 nm LED (13 mW/cm$^2$).

In a typical experiment, production of hydrogen occurred upon photolysis of a solution formed from nickel(II) nitrate and NCs in water. A control experiment without added $Ni^{2+}$ yields no significant $H_2$ production (FIG. 2A). Using an optimized combination of system components, 1.0 μM [Ni(NO$_3$)$_2$], 5.0 μM [NC(540)], and 0.8 M AA at pH 4.5 in water, this system achieves a turnover number (TON) over 600,000 mole $H_2$/mole catalyst after 110 h and an initial turnover frequency (TOF) of 7,000 mole $H_2$/mole catalyst/hour (FIG. 5). Even higher activity is obtained under the same photolysis conditions if the solvent is changed to 1:1 EtOH/$H_2$O (FIG. 6).

Figure 7:
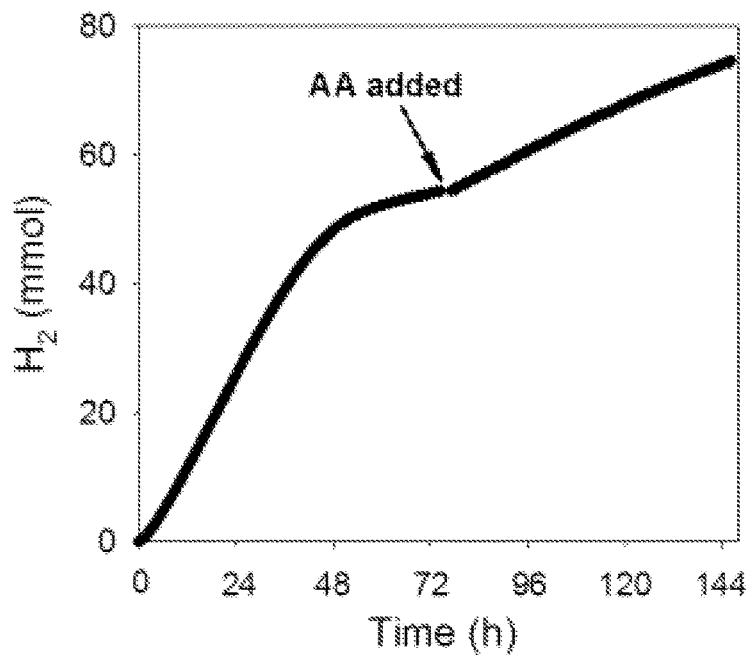
FIG. 7. Photocatalytic hydrogen production from a system containing NC(570) (4.0 μM), Ni(NO$_3$)$_2$ (4.0 μM), and AA (0.5 M) in $H_2O$ (5.0 mL) at pH 4.5 upon irradiation with 520 nm LED (13 mW/cm$^2$). After all AA was depleted, 0.44 gram of AA was added to the system to bring the [AA] back to 0.5 M and the pH was adjusted to 4.5 for restarting the photolysis. The rate is lower upon restarting, possibly because (a) the capping ligand on NCs was oxidized after AA was depleted or (b) the system is sensitive to oxygen and AA addition under air caused some degradation.

The initial rate of $H_2$ production is maximized when [AA]=0.3 M (FIG. 2B), and slows over time only upon depletion of the electron donor AA. Consistent with this interpretation, subsequent addition of AA restarts $H_2$ production (FIG. 7). With a high [AA]$_{initial}$=1.0 M, the system continues to produce $H_2$ over 360 hours (FIG. 2A). This unusual longevity is attributed to the use of NCs as photosensitizers, because other systems using transition metal catalysis and small-molecule photosensitizers (organic dyes, or Ru, Ir, Rh or Re coordination compounds) cease activity in under 50 hours due to bleaching of the dye.

We hypothesize that the catalytic system functions through light absorption by the CdSe nanocrystal, then electron transfer to the catalyst, then proton reduction by the catalyst. The absorption of the first excitonic state can be controlled by NC size, which correlates with the reduction potential of the excited state. As the NC size is made smaller, the activity of the system for $H_2$ production increases (FIG. 3A), which we attribute to an increase in NC reducing power. Conversely, there is no formation of $H_2$ with NC(620), presumably because the reduction potential for NC(620) lies below that needed for catalyst activity. Because the NC absorption edge is to the blue of the LED spectral emission profile, the system with NC(520) produces less $H_2$ than an identical one with NC(540) due to reduced light absorption.

Figure 8:
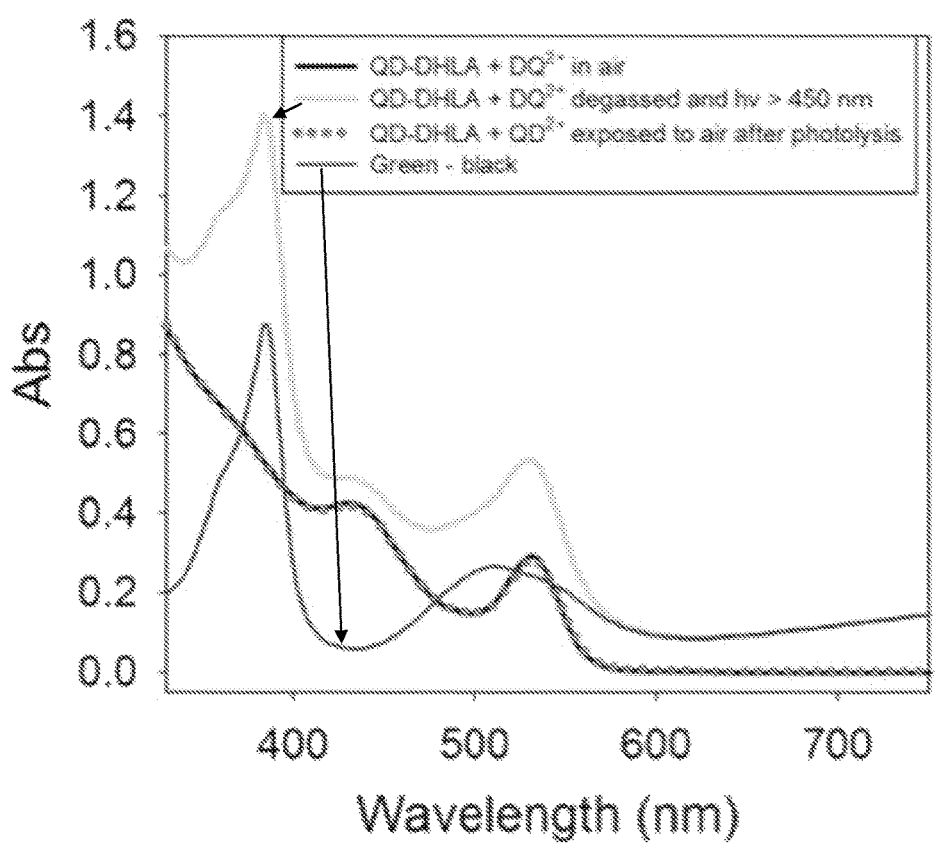
FIG. 8. Absorption spectra of system containing NC(530) (3.8 μM), $DQ^{2+}$ (40 μM) in 1:1 EtOH/$H_2O$ (3.0 mL) at pH 5.0 before irradiation, and after irradiation (λ>450 nm) for 5 min under $N_2$. The solution was then exposed to air (dotted). The difference of green and black spectra gives the absorption spectrum of the reduced $DQ^{2+}$ (30)

Reducible organic compounds were also used as indicators for the reducing power of the CdSe NCs. When a 3.8 μM solution of NC(530) in 1:1 EtOH/$H_2$O is photolyzed in the presence of methyl viologen dication ($MV^{2+}$) under $N_2$ for 5 min, the development of an intense blue color indicates formation of the reduced viologen $MV^{+\cdot}$. A similar result was obtained using a diquat acceptor $DQ^{2+}$ (N,N'-(1,3-propylene)-5,5'-dimethylbipyridine), as indicated by the pink color of the reduced $DQ^{+\cdot}$ (FIG. 8). While the precise potential for each NC was not determined, the result for $DQ^{2+}$ shows that the reducing ability of NC(530) is more negative than −0.7 V vs. NHE. These measurements agree with literature cyclic voltammetric studies that indicate a reduction potential more negative than −1 V for CdSe NCs of this size.

Figure 9:
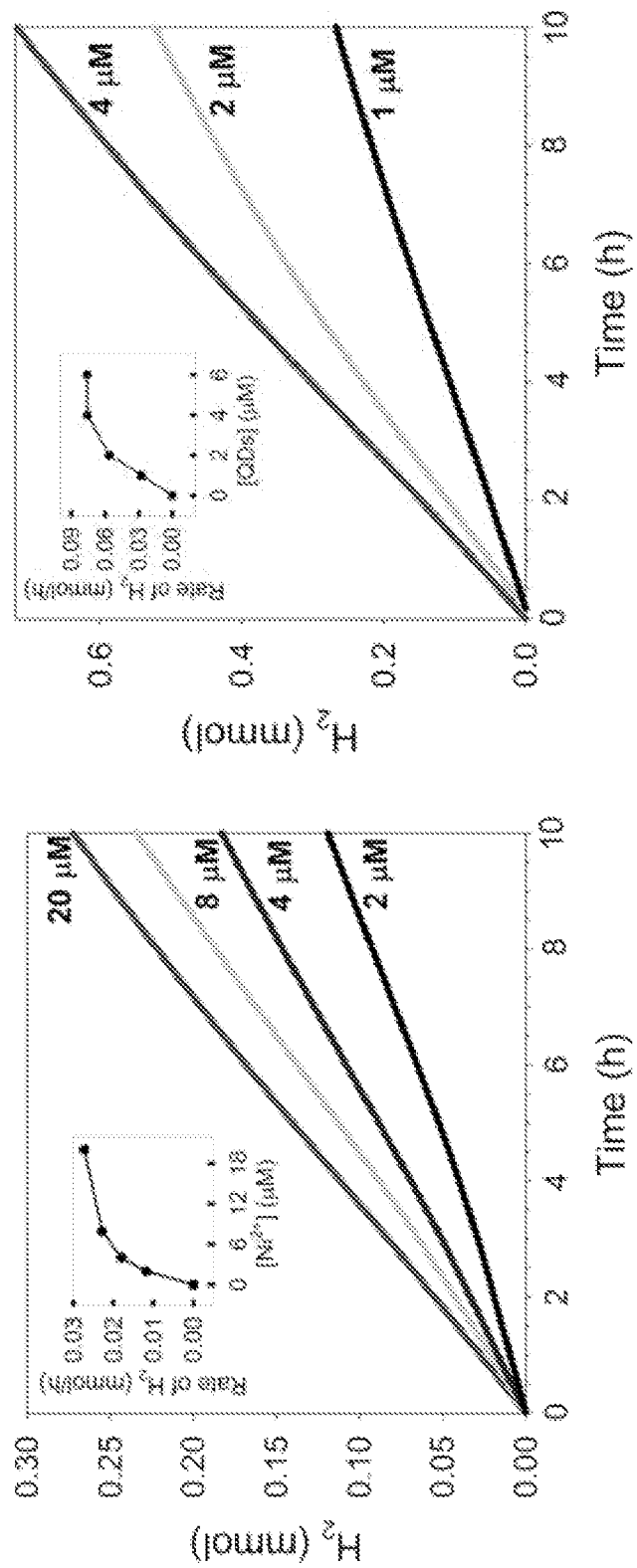
FIG. 9. Left: Photocatalytic hydrogen production from systems containing NC(520) (1.0 μM), AA (0.5 M) in $H_2O$ (5.0 mL) at pH 4.5 upon irradiation with 520 nm LED (13 mW/cm$^2$) when [Ni(NO$_3$)$_2$] was 2.0 μM (black), 4.0 μM (blue), 8.0 μM (green), 20.0 μM (red); inset: the rate of $H_2$ production. Right: Photocatalytic hydrogen production from systems containing Ni(NO$_3$)$_2$ (20.0 μM), AA (0.5 M) in $H_2O$ (5.0 mL) at pH 4.5 upon irradiation with 520 nm LED (13 mW/cm$^2$) when [NC(520)] was 1.0 μM (black), 2.0 μM (green), 4.0 μM (red); inset: the rate of $H_2$ production.
Figure 10:
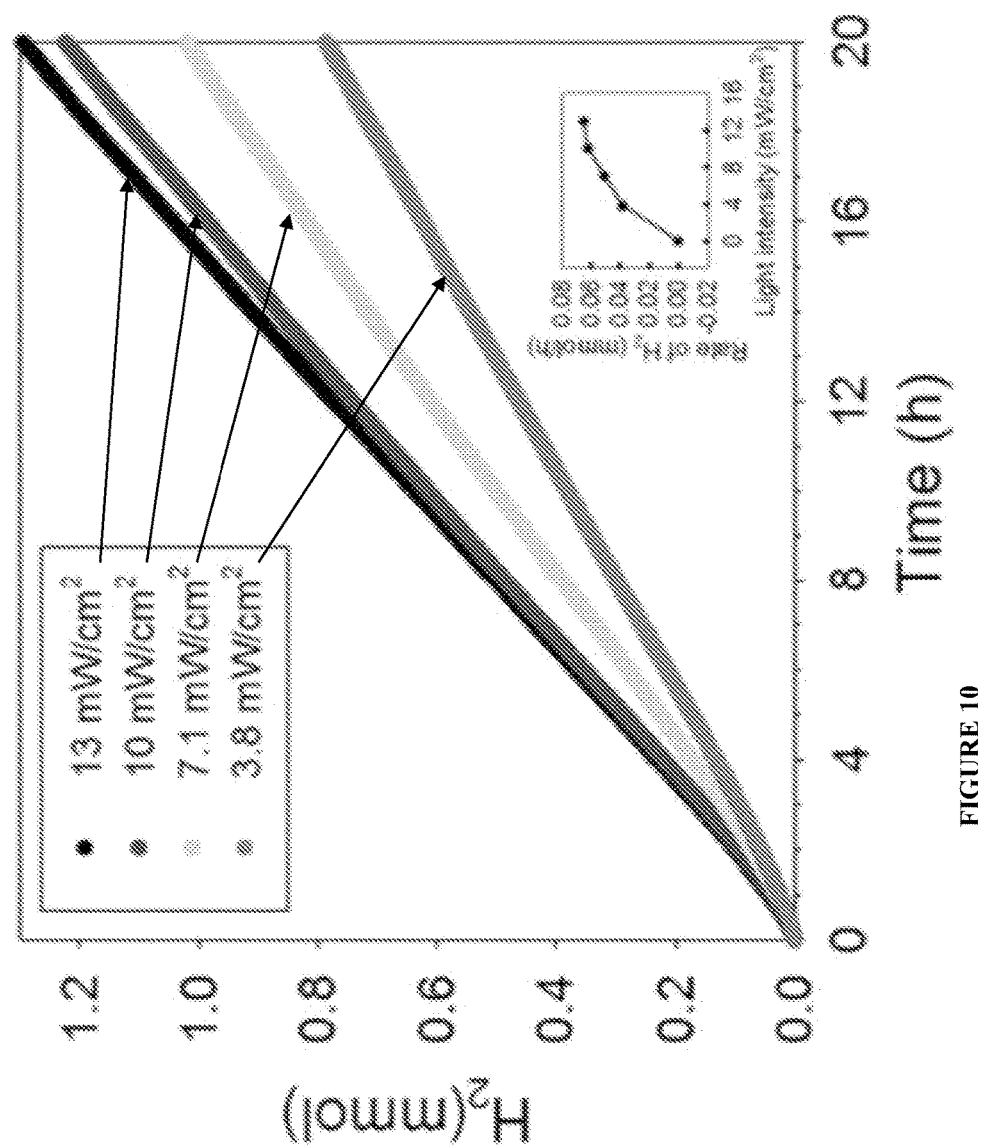
FIG. 10. Photocatalytic hydrogen production from systems containing NC(520) (3.8 μM), Ni(NO$_3$)$_2$ (20.0 μM), AA (0.5 M) in $H_2O$ (5.0 mL) at pH 4.5 upon irradiation with 520 nm LED when light intensity was 13 mW/cm$^2$, 10 mW/cm$^2$, 7.1 mW/cm$^2$, 3.8 mW/cm$^2$; inset: the rate of hydrogen production.

The catalytic mechanism was evaluated by varying the concentrations of system components. When [$Ni^{2+}$] is varied, the rate of $H_2$ production reaches a maximum at 20 μM [$Ni^{2+}$], whereas when the concentration of NC(520) is varied, the rate plateaus above 4.0 μM [NC] (FIG. 9). These results suggest that at [$Ni^{2+}$] of 20 μM or greater, the rate becomes limited by NC light absorption, whereas at [NC] of 4.0 μM, the system becomes limited by the $H_2$-forming reaction at $Ni^{2+}$. Similarly, when changing the light intensity, the rate of $H_2$ production reaches a maximum at 13 mW/cm$^{-2}$, at which point the rate becomes limited by NC light absorption for the system (FIG. 10).

Quantum yields for $H_2$ generation were determined for the system at [$Ni^{2+}$]=20 μM (where the rate of $H_2$ evolution is controlled by [NC]) with NCs of different sizes. The quantum yield φ based on two photons per $H_2$ evolved is approximately 36% at [NC(520)]=1-2 µM, decreasing to 20% at [NC(520)]=4.0 µM; similarly, $\varphi(H_2)$ is 35% at [NC(540)]=4.0 µM.

Figure 3:
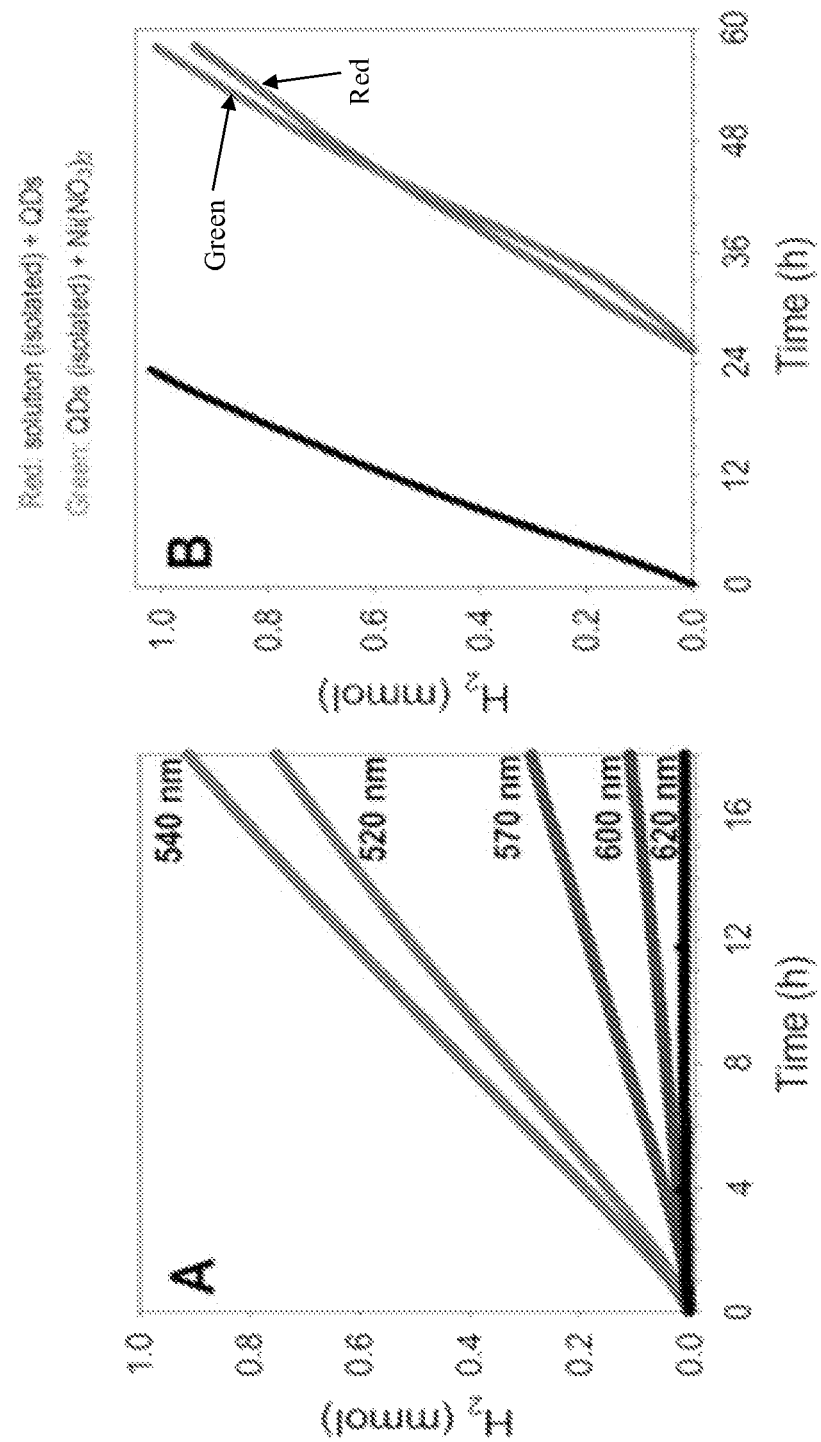
FIG. 3. (A) $H_2$ production from photolysis of aqueous solutions using different sizes of CdSe NCs (4.0 μM) labeled by their first excitonic absorption in nm, 4.0 μM [Ni(NO$_3$)$_2$], and 0.5 M AA. (B) When an active solution is filtered to separate the NCs from the solution nickel(II) catalyst, each component is inactive, but each component regains activity when the other is restored.
Figure 11:
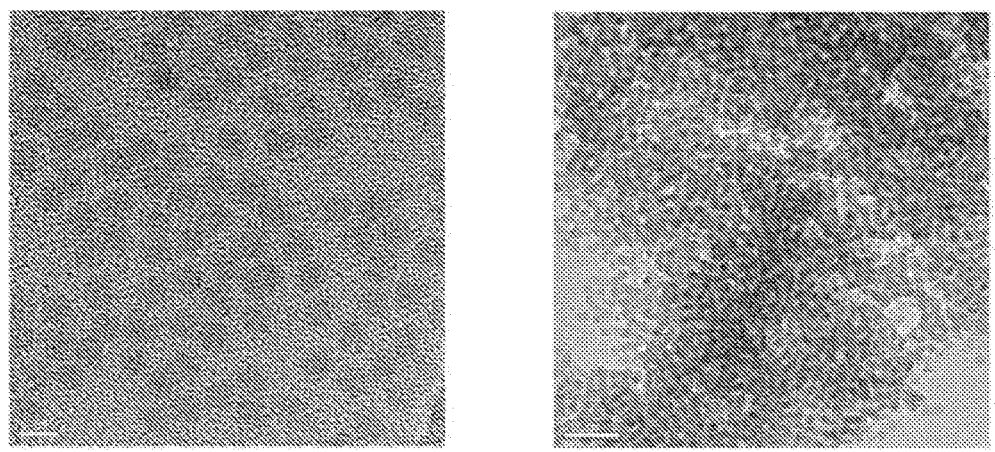
FIG. 11. Brightfield TEM images of the NC(570) sample before (a) and after (b) one week of photolysis. Scale bar is 5 nm in (a) and 20 nm in (b). NC diameter as determined from TEM analysis was 3.7 nm, in agreement with the diameter expected from absorption spectroscopy (3.5 nm). After photolysis the NC size remains the same, but the NCs were significantly more agglomerated due to partial loss of the DHLA capping ligand.
Figure 12:
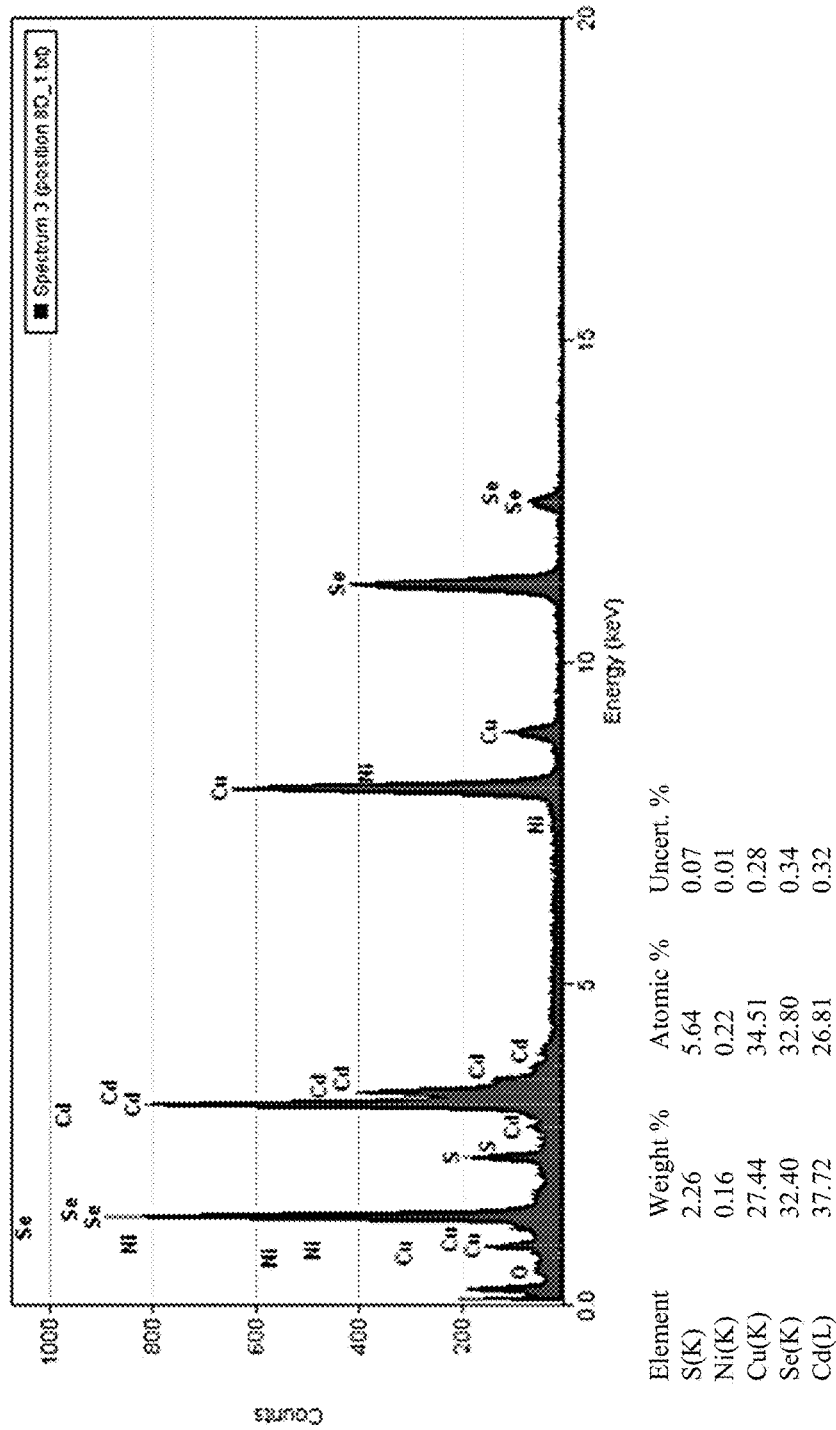
FIG. 12. (above) Energy dispersive X-ray spectrum from precipitated CdSe NCs after one week of photolysis. (below) Percent of each element present in the sample according to the above spectrum. Note that the % Ni listed is an upper bound and that after photolysis the amount of Ni present is negligible.

It is important to know whether or not the active catalyst is on the NC surface or in solution during photolysis. After photolysis of a NC(540)-based $H_2$ generating system for 24 h, the NCs were separated from the solution by centrifugation and filtration, and each component was examined separately for its $H_2$ generating activity with added AA. Neither the NCs nor the solution was found to have any significant activity for photolytic $H_2$ generation. The chemical composition of the NCs and solution were each examined by atomic absorption spectroscopy, showing that >97% of the Ni and <3% of the Cd remained in solution while >97% of Cd and <3% of the Ni remained in the precipitated NCs (Table 2). Additionally, TEM images of the separated NCs showed no significant change in NC size, and energy dispersive X-ray analysis showed no evidence of colloidal Ni deposited on the NC surface (FIG. 11-12). Importantly, addition of $Ni^{2+}$ and AA to the NCs restored activity for $H_2$ production upon resuspension; likewise, when fresh NC(540) and AA were added to the Ni-containing solution, we observed activities that were similar to those during the initial photolysis (FIG. 3B). The results clearly indicate that the active catalyst is a Ni species generated in solution, and that the NCs maintain their ability to act as the photosensitizer during the catalytic process.

Figure 13:
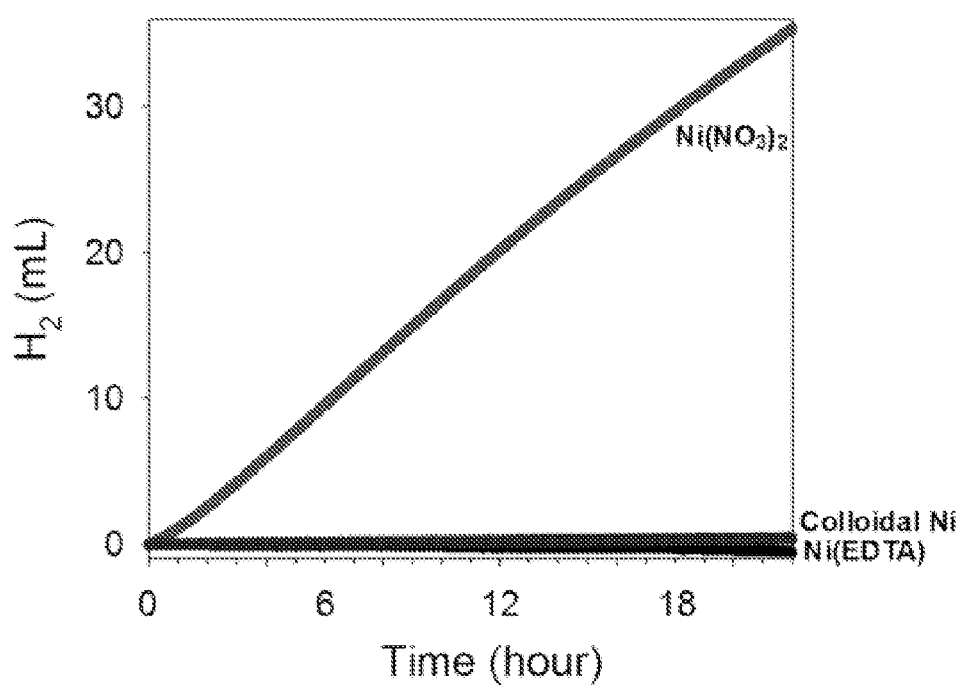
FIG. 13. Photocatalytic hydrogen production from systems containing NC(540) (4.0 μM), AA (0.5 M) in $H_2O$ (5.0 mL) at pH 4.5 upon irradiation with 520 nm LED (13 mW/cm$^2$ when catalyst is 4.0 μM [Ni(NO$_3$)$_2$], 4.0 μM [Ni(EDTA)] and 4.0 μM [colloidal Ni$^0$] (4 nm in diameter, concentration based on Ni atom).
Figure 14:
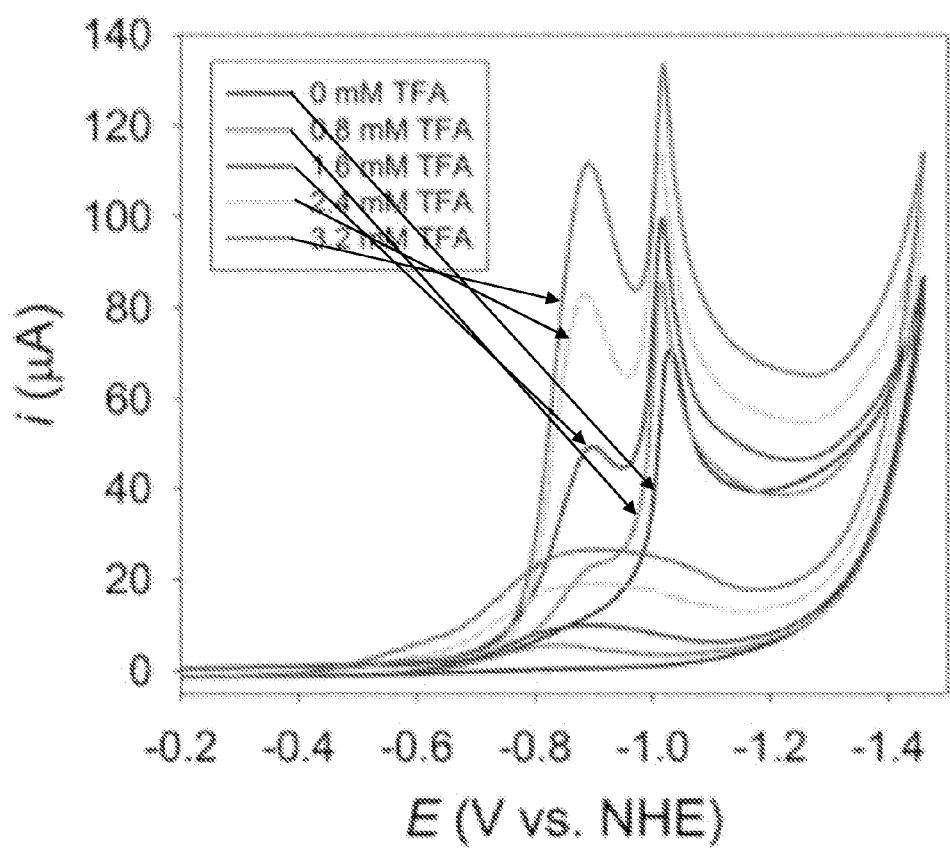
FIG. 14. Cyclic voltammograms of a pre-mixed solution containing 0.4 mM Ni(NO$_3$)$_2$ and 1.2 mM DHLA in 1:1 EtOH/$H_2O$ upon addition of 0.8 mM TFA, 1.6 mM TFA, 2.4 mM TFA, 3.2 mM TFA. Experiments used a glassy carbon working electrode, a Pt auxiliary electrode and an SCE reference at a scan rate of 100 mV/s. Potentials were converted to NHE.

The use of different $Ni^{2+}$ salts ($Ni(NO_3)_2$, $NiCl_2$ and $Ni(acetate)_2$) produces a similar level of $H_2$ production activity, suggesting that the actual catalyst is generated in situ. Maintaining a solution of NC(520) at pH 4.5 under $N_2$ in the absence of light for 5 h and centrifuging to precipitate the NCs gave a solution with 8-14 molecules of DHLA per NC, which had apparently dissociated from the NC. Thus the formation of a $Ni^{2+}$-DHLA complex is both possible and favorable in the catalytic solutions. Adding up to 100 equivalents of excess DHLA gave similar activity toward $H_2$ production rates, but addition of EDTA (which sequesters $Ni^{2+}$ and prevents formation of a $Ni^{2+}$-DHLA complex) eliminated activity (FIG. 13). Addition of colloidal $Ni^0$ (4 nm in diameter) in place of the nickel(II) salt gave no significant amount of $H_2$ under the standard catalytic conditions (FIG. 13). These experiments are consistent with a soluble nickel(II)-DHLA species being catalytically active. Finally, electrochemical studies on independently prepared 1:1 $Ni^{2+}$-DHLA solutions (0.2 µM in 1:1 $EtOH/H_2O$) show a cathodic feature at −0.9 V vs. NHE that appears upon addition of acid (FIG. 14), indicating that Ni-DHLA can reduce protons catalytically at a potential less negative than that produced by the excited NCs.

Figure 15:
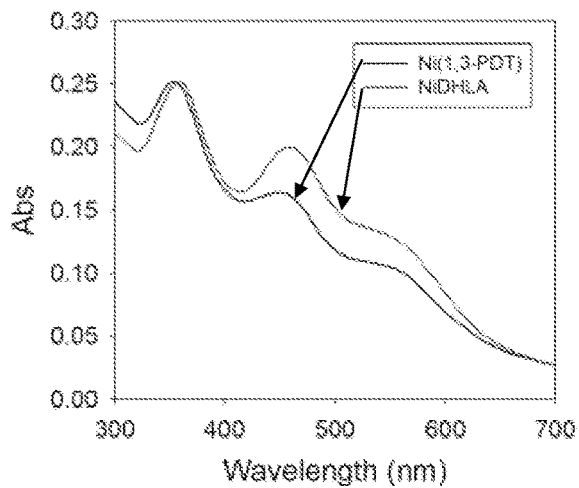
FIG. 15. Absorption spectra of solutions containing 5.0× $10^{-5}$ M Ni(NO$_3$)$_2$ with 0.2 M acetic acid/acetate buffer (pH 4.5 in $H_2O$) in 1:1 EtOH/$H_2O$ when mixed with 2.5×$10^{-4}$ M DHLA, and 2.5×$10^{-4}$ M 1,3-PDT.
Figure 16:
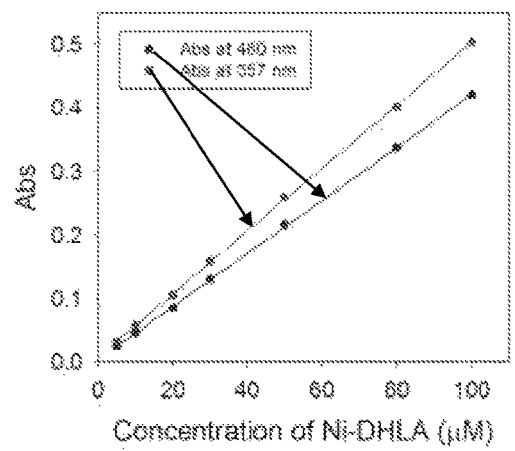
FIG. 16. Top: The absorption maxima of 1:1 Ni-DHLA complex in 1:1 EtOH/$H_2O$ with 0.2 M acetic acid/acetate buffer (pH 4.5 in $H_2O$) increases linearly with [Ni-DHLA]. Bottom: Job plots (31) of Ni-DHLA complex (two separate trials) in 1:1 EtOH/$H_2O$ with 0.2 M acetic acid/acetate buffer (pH 4.5 in $H_2O$).
Figure 16:
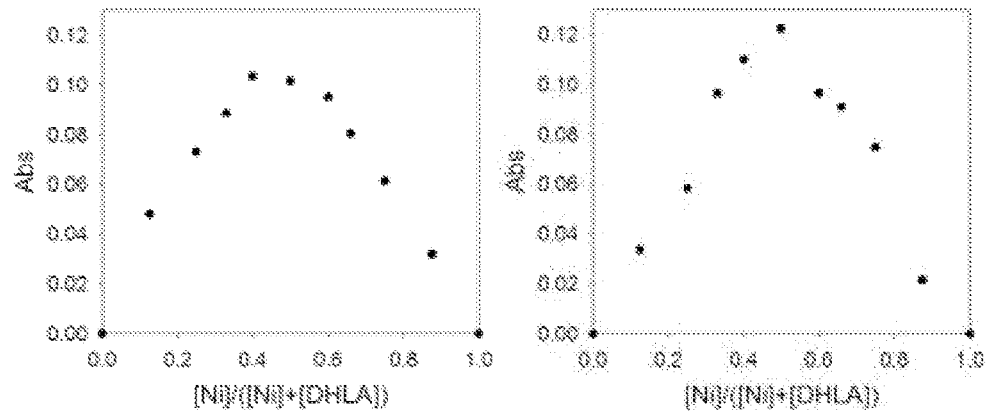
Figure 17:
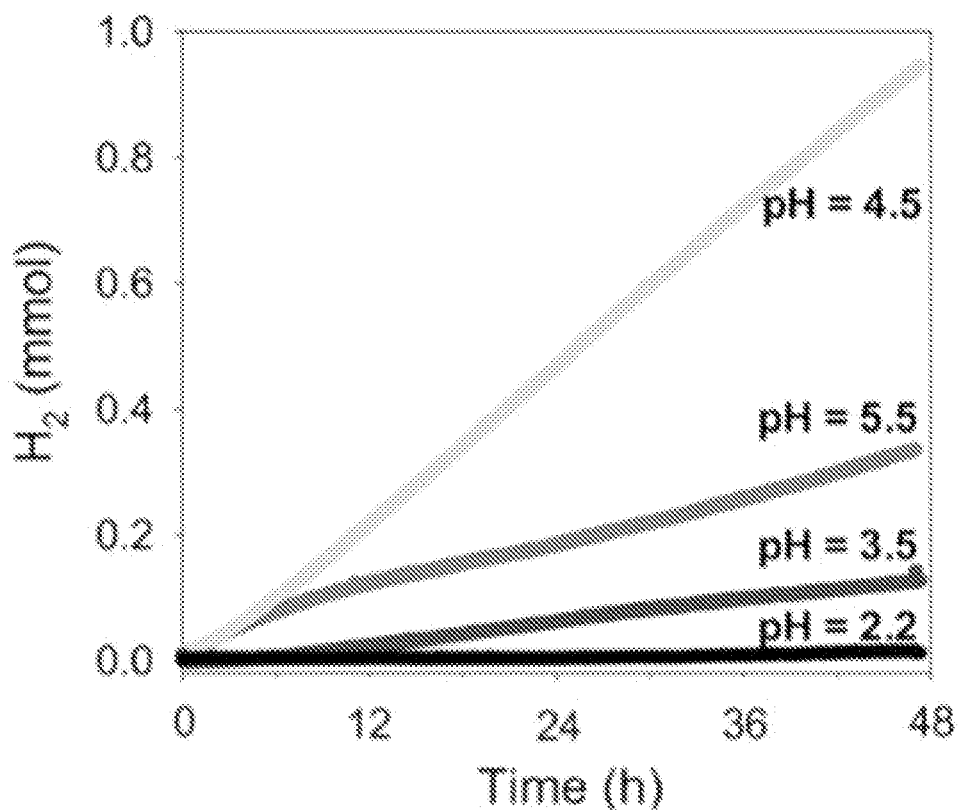
FIG. 17. Photocatalytic hydrogen production from systems containing NC(570) (1.0 μM), Ni(NO$_3$)$_2$ (20.0 μM), AA (0.5 M) in $H_2O$ (5.0 mL) upon irradiation with 520 nm LED (13 mW/cm$^2$), when pH was 2.2, 3.5, 4.5, 5.5.
Figure 18:
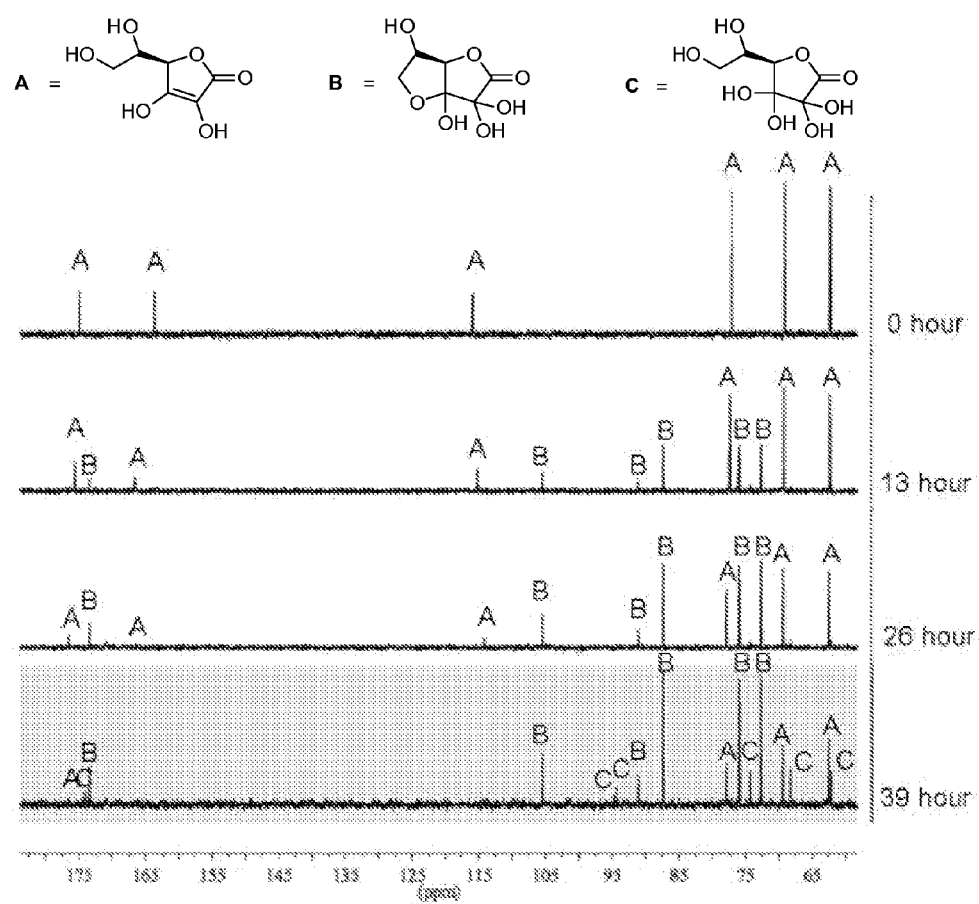
FIG. 18. Time dependence of $^{13}C$ NMR spectra in solutions containing CdSe-DHLA NC(520) (4.0 μM), Ni(NO$_3$)$_2$ (4.0 μM), AA (0.3 M) in $D_2O$ (5.0 mL) at pH 4.5 upon irradiation with 520 nm LED (13 mW/cm$^2$). Label for resonances are as follows: (A) ascorbic acid, (B) hydrate dehydroascorbic acid (32), (C) dihydrate dehydroascorbic acid (33,34).
Figure 19:
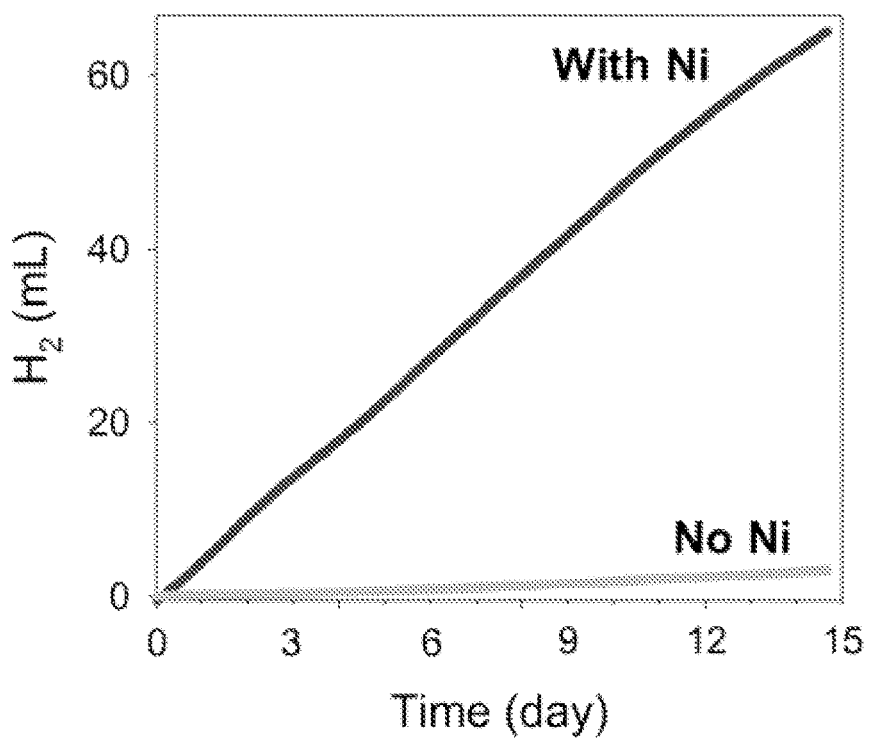
FIG. 19. Hydrogen production from systems containing CdSe-DHLA, Ni(NO$_3$)$_2$ and ascorbic acid in $H_2O$ at pH 4.5 upon irradiation with 520 nm light.

Although we have not yet determined the structure of the catalytically active nickel species, spectroscopic studies on $Ni^{2+}$-DHLA help to understand the predominant forms of nickel in solution. The UV-visible spectrum of a 1:5 mixture of $Ni^{2+}$ (50 µM) and DHLA (250 µM) at pH 4.5 is very similar to that generated with a mixture of $Ni^{2+}$ (50 µM) and 1,3-propanedithiol, suggesting that $Ni^{2+}$ coordinates via the S donors of DHLA (FIG. 15). The absorption maxima from a 1:1 Ni-DHLA solution follow Beer's Law between 5.0 and 500 µM, indicating that nickel speciation does not change over the [$Ni^{2+}$] and [DHLA] concentrations employed in the catalytic experiments (FIG. 15). A Job plot of $Ni^{2+}$ and DHLA in this concentration regime has a maximum at a metal/DHLA ratio of roughly 1:1, suggesting that the predominant complex has one DHLA per $Ni^{2+}$ (FIG. 16). Reports of nickel complexes and related dithiols (including 1,3-propanedithiol) have shown multimetallic structures containing square-planar nickel(II) centers bridged by thiolates, with stoichiometries such as 3:4, 4:4, 6:6, and 6:7. Since nickel-thiolate species are labile in solution, many nickel species are accessible under the reaction conditions, and detailed mechanistic studies will be necessary to identify the one(s) responsible for proton reduction in this system.

A light-driven system for the photogeneration of hydrogen that consists of simple components containing only Earth-abundant elements could have a significant impact on the sustainable production of chemical fuels. Further, the robustness of the system may be generalizable to other nanoparticle systems, such as Type II NCs and dot-in-rod NCs, which are better engineered for charge separation. This particular NC-DHLA-Ni system exhibits high activity for proton reduction and impressive durability, which suggests that it could also serve as a valuable component in complete AP water splitting systems for light-to-chemical energy conversion.

Materials and Methods. General Considerations. CdSe nanocrystals (NCs) (13), dihydrolipoic acid (DHLA) and colloidal $Ni^0$ were synthesized by modified methods from literature. All solvents were used without further purification unless otherwise stated. Nickel(II) chloride hexahydrate, nickel(II) nitrate hexahydrate, nickel (II) acetate tetrahydrate, ascorbic acid (AA), 1,3-propanedithiol (1,3-PDT), and potassium nitrate were purchased from Aldrich and used without further purification.

Nanocrystal Synthesis. Abbreviations: $CdAc_2$ cadmium acetate, ≥99%; HDA 1-hexadecylamine, ≥99%; TDPA n-tetradecylphosphonic acid, 98%; TOP tri-n-octylphosphine, 97%; TOPO tri-n-octylphosphine oxide, 99%; TOP-Se tri-n-octylphosphine-selenide. TOPO (4.0 g), HDA (2.5 g) and TDPA (0.075 g) were added into a three-neck flask. These reactants were sealed and degassed under a slight vacuum at 100° C. for half an hour under anaerobic conditions. Under an argon atmosphere, 1 mL of 1 M TOP-Se (made previously by dissolving 0.7896 g Se in 10 mL TOP), was injected into the flask. Then, the solution was degassed under vacuum for another 15 min, switched over to an Ar atmosphere, and heated to 300° C. At this time, 1.5 ml Cd-TOP (made by dissolving 0.12 g $CdAc_2$ in 3 mL TOP) was injected swiftly. The temperature of solution was immediately set to 260° C. for CdSe nanocrystal growth, followed by cooling to room temperature. The size of CdSe nanocrystals was controlled by varying the growing time and the solvent concentration.

Dihydrolipoic acid (DHLA) preparation. A total of 1.2 g of sodium borohydride ($NaBH_4$) was added to a solution of α-lipoic acid (6.00 g) in 117 mL of 0.25 M sodium bicarbonate ($NaHCO_3$). The reaction was stirred at 0° C. for 1 hour. The colorless reaction mixture was acidified to pH 1 with 5 M hydrochloric acid (HCl) at 0° C. and then extracted with dichloromethane ($CH_2Cl_2$) twice and finally washed with a saturated sodium chloride (NaCl) solution once. The organic phase was dried over magnesium sulfate ($MgSO_4$), filtered and the solvent removed by rotary evaporation.

Typical synthesis of DHLA-CdSe nanocrystals. Typically, 100 uL DHLA was added to a 12 mL solution of methanol containing approximately 200 nmol CdSe nanocrystals and 154 mg tetramethylammonium hydroxide pentahydrate. This reaction was then refluxed under nitrogen at 65° C. for 6 hours. Twice the CdSe-DHLA nanocrystals were washed by precipitating from methanol using a mixture of ethyl acetate and ether followed by centrifugation. The washed CdSe-DHLA sample was suspended in phosphate buffered saline.

Characterization of Nanocrystals by Absorption Spectroscopy. UV-VIS absorption spectra were taken on a Perkin-Elmer Lambda 950 UV/Vis/NIR spectrophotometer. Aqueous NC samples were dissolved in phosphate buffered saline (PBS) solution and placed in a 1 cm path length cuvette. Organic capped NCs were measured with hexane as the solvent.

Transmission electron microscopy and Energy dispersive X-ray analysis. Transmission electron microscopy (TEM) images were taken on a FEI TECNAI F-20 field emission microscope at an accelerating voltage of 200 kV. Energy dispersive X-ray Spectroscopy (EDS) analysis of the NCs was also carried out on the same TEM operating in STEM mode.

LED Photolysis Set-up for Hydrogen Evolution Studies. Samples were prepared in 40 mL scintillation vials and protected from light before use. Varying amounts of $Ni^{2+}$, CdSe-DHLA NCs and AA in $H_2O$ or 1:1 $EtOH/H_2O$ were added to obtain a total volume of 5.0 mL. The pH of this solution was adjusted to a specific pH by adding HCl or NaOH and measured with a pH meter. The samples were placed into a temperature controlled block at 15° C. and sealed with an air-tight cap fitted with a pressure transducer and a septum. The samples were then degassed with 4:1 $N_2/CH_4$ atmosphere (1 atm), and the $H_2$ peak was measured at the end of each experiment relative to that of $CH_4$ being used as an internal reference for GC analysis. The cells were irradiated from below the vials with high power Philips LumiLED Luxeon Star Hex green (520 nm) 700 mA LEDs. The light power of each LED was set to 70 mW and measured with an L30 A Thermal sensor and Nova II power meter (Ophir-Spiricon LLC). The samples were swirled using an orbital shaker. The pressure changes in the vials were recorded using a Labview program from a Freescale semiconductor sensor (MPX4259A seris). At the end of the irradiation the headspace of the vials were sampled by gas chromatography to ensure that the measured pressure change was caused by $H_2$ generation, and to double check that the amount of generated hydrogen calculated by the change in pressure corresponded to the amount determined by the GC. The amounts of hydrogen evolved were determined using a Shimadzu GC-17A gas chromatograph with a 5 Å molecular sieve column (30 m, 0.53 mm) and a TCD detector, by injecting 100 µL of headspace into the GC, and were quantified by a calibration plot to the internal $CH_4$ standard.

Quantum Yield Measurement. The difference between the power of light passing through the blank (containing $Ni(NO_3)_2$ and AA) and through the sample (containing CdSe NCs, $Ni(NO_3)_2$ and AA) was used to calculate the light absorbed by the NCs, for four samples, with 1.0 µM NC(520), 2.0 µM NC(520), 4.0 µM NC(520), and 4.0 µM NC(540), with 20 µM $Ni(NO_3)_2$ and 0.5 M AA in $H_2O$ (pH=4.5). The power of the light "P" (in Watts), corresponding to the difference in power between the solution containing NCs and the reference sample, was measured with a L30 A Thermal sensor and Nova II Power meter (Ophir-Spiricon LLC). The average rate of hydrogen production "k" (mol of $H_2$/s) was determined by taking amount of $H_2$ generated from the first 10 hours illumination. The quantum efficiency "φ" was calculated by determining the number of moles of hydrogen produced per second, and dividing it by the number of moles of photons absorbed by the system per second (two photons per $H_2$).

$$P = \frac{c \times h \times n}{\lambda \times t}$$

$$q_p = n/t_{(s)}$$

$$\phi = 2k/q_p$$

Where λ was taken to be 520 nm, h is Planck's constant (in J/s), c is the speed of light (in m/s), n is the number of photons, t is the time (in second), $q_p$ is the photon flux (number of photons per second). The average of the quantum yield for each sample was taken and the uncertainties reported arise from slight differences in sample preparation, power meter readings and pressure sensor measurements.

TABLE 1

Quantum yields of $H_2$ production for NC(520) and NC(540) at 520 nm light.

| [NCs] (µM) | $k^a$ (mol $H_2$/s) | $P^a$ (W) | $q_p^a$ (mol photo/s) | $\phi_2^a$ (%) |
|---|---|---|---|---|
| 1.0 µM NC(520) | 6.21 (0.56) × $10^{-9}$ | 0.008 (0.002) | 3.48 (0.87) × $10^{-8}$ | 36 (10) |
| 2.0 µM NC(520) | 1.33 (0.12) × $10^{-8}$ | 0.017 (0.002) | 7.39 (0.87) × $10^{-8}$ | 36 (5.0) |
| 4.0 µM NC(520) | 1.53 (0.14) × $10^{-8}$ | 0.035 (0.002) | 1.52 (0.87) × $10^{-7}$ | 20 (2.1) |
| 4.0 µM NC(540) | 3.55 (0.32) × $10^{-8}$ | 0.047 (0.003) | 20.4 (0.87) × $10^{-7}$ | 35 (3.9) |

$^a$errors based on three parallel experiments were indicated in parenthesis.
Sample calculation for QY:
$H_2$ generated in 10 hours: 10.7 mL
Mol of $H_2$ in 10 hours: 4.78 × $10^{-4}$ mol
k = 4.78 × $10^{-4}$/36000 = 1.33 × $10^{-8}$ mol/s
$q_p$ = (P*λ)/(c*h) = [(0.017 J/s) × (520 × $10^{-9}$ m)]/[(3.0 × $10^8$ m/s)(6.626 × $10^{-34}$ J/s)] = 4.45 × $10^{16}$
$s^{-1}$ = 7.39 × $10^{-8}$ mol/s
$\phi_2 = 2k/q_p$ = (2 × 1.33 × $10^{-8}$ mol/s)/(7.39 × $10^{-8}$ mol/s) = 36%

Ni and Cd Detection by Atomic Absorption Spectra. Cadmium and nickel determinations were performed using a Perkin-Elmer PinAAcle 900Z atomic absorption spectrophotometer (AAS) equipped with longitudinal Zeeman background correction and a transverse heated graphite furnace (Perkin-Elmer Life and Analytical Sciences, Shelton, Conn. 06484 USA). Cadmium absorption was measured at 228.8 nm using a Perkin-Elmer System 2 electrodeless discharge lamp source. A mixed matrix modifier of ammonium phosphate and magnesium nitrate was used to stabilize cadmium during the pyrolysis furnace step. Nickel absorption was determined at 232 nm using Perkin-Elmer Lumina hollow cathode lamp. Samples were prepared by taking 1 mL aliquots to dryness on a 90° C. hotplate. The residue was dissolved in 200 uL of 70% ultrapure nitric acid (Baseline, SeaStar Chemicals Inc., Sidney, BC, Canada V8L3S8) and the volume adjusted to 10 mL with 18 MΩ deionized water.

AAS Conditions for Cadmium Analysis

| | |
|---|---|
| Wavelength | 228.8 nm |
| Slit width | 0.7 nm |
| Cd lamp current | 230 mA |
| Background correction | Zeeman-effect |
| Integration time | 3 seconds |
| Injection volume | 12 µL |
| Matrix modifier volume | 3 µL |

AAS Conditions for Nickel Analysis

| Wavelength | 232 nm |
| --- | --- |
| Slit width | 0.2 nm |
| Ni lamp current | 25 mA |
| Background correction | Zeeman-effect |
| Integration time | 4 seconds |
| Injection volume | 20 μL |

Two parallel solutions (A and B) containing CdSe-DHLA NC(520) (4.0 μM), Ni(NO$_3$)$_2$ (4.0 μM), AA (0.5 M) in 1:1 EtOH/H$_2$O (5.0 mL) at pH 5.0 were photolyzed with 520 nm LED (13 mW/cm$^2$) for 24 hours. The solutions were then centrifuged at ~3000 rpm for 10 min. The supernatants and NCs collected from centrifugation were dissolved in concentrated nitric acid and the final volume of each was brought up to 10.0 mL for AAS analysis for both Ni and Cd concentrations. The concentrations of Ni and Cd were calculated based on standard calibration curves.

TABLE 2

Ni and Cd detection for the photolysis solutions by Atomic Absorption Spectra

| | Ni$_{initial}$ (mol) | Ni$_{detected}$ (mol) | NC$_{initial}$ (mol) | Cd$_{detected}$ (mol) |
| --- | --- | --- | --- | --- |
| Solution A (supernatant) | 2.0 × 10$^{-8}$ (total) | 1.93 × 10$^{-8}$ | 2.0 × 10$^{-8}$ (total) | 3.11 × 10$^{-8}$ |
| Solution A (NCs isolated) | | 6.59 × 10$^{-10}$ | | 1.20 × 10$^{-6}$ |
| Solution B (supernatant) | 2.0 × 10$^{-8}$ (total) | 19.2 × 10$^{-8}$ | 2.0 × 10$^{-8}$ (total) | 3.66 × 10$^{-8}$ |
| Solution B (NCs isolated) | | 5.80 × 10$^{-10}$ | | 1.40 × 10$^{-6}$ |

The % of Ni was 96.7% in solution A (supernatant) and was 97.1% in solution B (supernatant).
The % of Cd was 97.5% in solution A (NCs isolated) and was 97.5% in solution B (NCs isolated).

Determination of DHLA Dissociation from CdSe NCs. A 10.6 μM CdSe-DHLA NC(520) solution in 1:1 EtOH/H$_2$O (10.0 mL) was kept in the dark under N$_2$ for 5 hours. The solution was then centrifuged at ~3000 rpm for 10 min to remove the precipitated NCs and this process was repeated. UV-vis spectra of this clear solution indicated that the total amount of leftover NCs was less than 7.0×10$^{-11}$ mol. The solution was then dried under vacuum and the solid was re-dissolved in 0.8 mL DMSO-d$_6$ containing 5.9×10$^{-7}$ mol benzene as internal standard. The $^1$H NMR spectrum was recorded on a Bruker Avance 400 MHz spectrometer. The concentration of the DHLA was calculated to be in the range from 8.5×10$^{-7}$ mol to 1.5×10$^{-6}$ mol based on peak integrations with respect to benzene.

Cyclic Voltammetry. Cyclic Voltammetry (CV) measurements of the Ni-DHLA complex were performed with a CH potentiostat using a one-compartment cell with a glassy carbon working electrode, Pt auxiliary electrode, and SCE reference electrode. The electrolyte for electrochemistry in 1:1 EtOH/H$_2$O was 0.1 M potassium nitrate. Argon was used to purge all samples.

Acid Concentration Dependence Study. A 0.50 M stock solution of trifluoroacetic acid was prepared in a H$_2$O solution of 0.1 M KNO$_3$. A 5 mL solution containing 0.4 mM Ni(NO$_3$)$_2$ and 1.2 mM DHLA was stirred under argon for one hour. 8 μL acid stock (0.8 mM aliquots) solution was added to the Ni-DHLA solution and purged with argon for another 300 s before performing cyclic voltammetry.

Beer's Law by UV-vis Absorption Spectra. A stock solution was prepared by mixing equal volumes of 4.0 mM Ni(NO$_3$)$_2$ solution (with 0.4 M acetic acid/acetate as buffer in H$_2$O at pH 4.5) and a 4.0 mM DHLA solution (in EtOH). The mixture was stirred for one hour to allow the formation of the red color Ni-DHLA complex in situ. This solution was diluted to specific concentration (from 1.0×10$^{-4}$ M to 5.0× 10$^{-6}$ M) with 0.2 M acetic acid/acetate buffer solution at the same pH and UV-vis absorption spectra of the solutions were obtained on a Cary 60 spectrometer.

Job Plot by UV-vis Absorption Spectra. All solutions were prepared in 0.2 M acetic acid/acetate buffer solution (pH=4.5 in H$_2$O) in 1:1 EtOH/H$_2$O. A series of solutions for UV-vis measurements were prepared by mixing a solution containing 2.0×10$^{-4}$ M Ni(NO$_3$)$_2$ and a solution containing 2.0×10$^{-4}$ M DHLA solution in specific ratio (from 1:8 to 8:1; 3.0 mL total). These solutions were stirred under N$_2$ for 6 hours to allow the formation of Ni-DHLA before spectra were taken. The UV-vis absorption spectra of the solutions were obtained on a Cary 60 spectrometer.

What is claimed is:

1. A method for producing hydrogen comprising the steps of:
    a) contacting a nanoparticle, wherein the nanoparticle is selected from CdSe, CdS, CdTe, PbS, PbTe, PbSe, GaAs, InP, InAs, Si, and Ge nanoparticles and the nanoparticles are core-shell nanocrystals, nanorods, or dot-in rods, and a group 6 to group 11 transition metal salt catalyst in an aqueous medium to form a mixture in the presence of a source of electrons; and
    b) exposing the mixture from a) to electromagnetic radiation having at least a wavelength in the absorption profile of the nanoparticle,
   wherein the nanoparticle, the group 6 to group 11 transition metal salt complex catalyst, and aqueous medium are present as a mixture and,
   wherein upon exposure to the electromagnetic radiation the nanoparticle is capable of generating an electron that can reduce, in the presence of the group 6 to group 11 transition metal salt complex catalyst, a proton in the aqueous medium, and
   wherein the source of electrons is capable of reducing the nanoparticle after reduction of the proton,
   such that hydrogen is produced.

2. The method of claim 1, wherein the group 6 to group 11 transition metal salt is generated in situ.

3. The method of claim 1, wherein the source of electrons is a sacrificial electron donor and is present in the mixture.

4. The method of claim 1, wherein the source of electrons is an external source of electrons.

5. The method of claim 4, wherein the external source of electrons is a solar cell or an electrochemical bias.

6. The method of claim 1, wherein the aqueous medium is water.

7. A composition for producing hydrogen comprising:
    a) a nanoparticle, wherein the nanoparticle is selected from CdSe, CdS, CdTe, PbS, PbTe, PbSe, GaAs, InP, InAs, Si, and Ge nanoparticles, wherein the nanoparticles are core-shell nanocrystals, nanorods, or dot-in rods;
    b) a group 6 to group 11 transition metal salt catalyst;
    c) a source of electrons; and
    d) an aqueous medium;
   wherein the nanoparticle, the group 6 to group 11 transition metal salt complex catalyst, and aqueous medium are present as a mixture and,
   wherein upon exposure to electromagnetic radiation having a wavelength in the absorption profile of the nanoparticle the nanoparticle is capable of generating an electron that can reduce, in the presence of the group 6 to group 11 transition metal salt complex catalyst, a proton in the aqueous medium and the source of electrons is capable of reducing the nanoparticle after reduction of the proton.

8. The composition of claim 7, wherein the source of electrons is also present in the mixture.

9. The composition of claim 7, wherein the nanoparticles are nanocrystals.

10. The composition of claim 7, wherein the group 6 to group 11 transition metal salt is a $Ni^{2+}$ salt.

11. The composition of claim 7, wherein the source of electrons is a sacrificial electron donor.

12. The composition of claim 7, wherein the source of electrons is an external source of electrons.

13. The composition of claim 12, wherein the external source of electrons is a solar cell or an electrochemical bias.

14. The composition of claim 7, wherein the aqueous medium is water.

15. The composition of claim 7, wherein the group 6 to group 11 transition metal salt catalyst is in solution in the aqueous medium.

16. A composition for producing hydrogen comprising:
a) a nanoparticle, wherein the nanoparticle is selected from CdSe, CdS, CdTe, PbS, PbTe, PbSe, GaAs, InP, InAs, Si, and Ge nanoparticles;
b) a group 6 to group 11 transition metal salt catalyst;
c) a source of electrons; and
d) an aqueous medium comprising water and a protic organic solvent;

wherein the nanoparticle, the group 6 to group 11 transition metal salt complex catalyst, and aqueous medium are present as a mixture and, wherein upon exposure to electromagnetic radiation having a wavelength in the absorption profile of the nanoparticle the nanoparticle is capable of generating an electron that can reduce, in the presence of a metal complex catalyst, a proton in the aqueous medium and the source of electrons is capable of reducing the nanoparticle after reduction of the proton.

17. The composition of claim 16, wherein the source of electrons is also present in the mixture.

18. The composition of claim 16, wherein the source of electrons is a sacrificial electron donor.

19. The composition of claim 16, wherein the source of electrons is an external source of electrons.

20. The composition of claim 16, wherein the aqueous medium is water.

* * * * *